US008478861B2

(12) United States Patent
Taylor et al.

(10) Patent No.: US 8,478,861 B2
(45) Date of Patent: Jul. 2, 2013

(54) MANAGING DISTRIBUTED DEVICES WITH LIMITED CONNECTIVITY

(75) Inventors: John L. Taylor, Webster, NY (US); David P. Hart, Webster, NY (US); John D. Liberty, Webster, NY (US); Robert K. Kistler, San Francisco, CA (US)

(73) Assignee: Axeda Acquisition Corp., Foxboro, MA (US)

( * ) Notice: Subject to any disclaimer, the term of this patent is extended or adjusted under 35 U.S.C. 154(b) by 336 days.

(21) Appl. No.: 11/774,474

(22) Filed: Jul. 6, 2007

(65) Prior Publication Data
US 2009/0013064 A1    Jan. 8, 2009

(51) Int. Cl.
G06F 15/173    (2006.01)
G06Q 10/06    (2012.01)

(52) U.S. Cl.
USPC .......................................... 709/224; 705/412

(58) Field of Classification Search
USPC ............................ 709/224; 455/411; 705/412
See application file for complete search history.

(56) References Cited

U.S. PATENT DOCUMENTS

| 4,086,434 | A | 4/1978 | Bocchi |
| 4,412,292 | A | 10/1983 | Sedam et al. |
| 4,497,037 | A | 1/1985 | Kato et al. |
| 4,583,834 | A | 4/1986 | Seko et al. |
| 4,853,946 | A | 8/1989 | Elliott et al. |
| 4,962,368 | A | 10/1990 | Dobrzanski et al. |
| 4,964,065 | A | 10/1990 | Hicks et al. |
| 4,965,946 | A | 10/1990 | Hegedus et al. |
| 4,996,703 | A | 2/1991 | Gray |
| 5,038,319 | A | 8/1991 | Carter et al. |
| 5,057,866 | A | 10/1991 | Hill, Jr. et al. |
| 5,077,582 | A | 12/1991 | Kravette et al. |
| 5,084,875 | A | 1/1992 | Weinberger et al. |
| 5,129,080 | A | 7/1992 | Smith |
| 5,138,377 | A | 8/1992 | Smith et al. |
| 5,163,151 | A | 11/1992 | Bronikowski et al. |
| 5,184,179 | A | 2/1993 | Tarr et al. |
| 5,204,699 | A | 4/1993 | Birnbaum et al. |
| 5,212,645 | A | 5/1993 | Wildes et al. |
| 5,214,772 | A | 5/1993 | Weinberger et al. |
| 5,216,461 | A | 6/1993 | Maekawa et al. |
| 5,220,380 | A | 6/1993 | Hirata et al. |

(Continued)

FOREIGN PATENT DOCUMENTS

| EP | 0874306 | 10/1998 |
| EP | 1 191 744 | 3/2002 |

(Continued)

OTHER PUBLICATIONS

"Frequently Asked Questions about the Extensible Markup Language—The XML FAQ" Version 1.41 (http://www.oasis-open.org/cover/xmlFAQ141-19981006.html) (Oct. 6, 1998).

(Continued)

Primary Examiner — Viet Vu
Assistant Examiner — Michael A Chambers
(74) Attorney, Agent, or Firm — Fish & Richardson P.C.

(57) ABSTRACT

A method of managing devices may include downloading information to a courier device from an enterprise. The information may be information for performing a device management operation. The method also includes communicating the information from the courier device to a monitored agent coupled to at least one of a disconnected device and an intermittently connected device.

29 Claims, 7 Drawing Sheets

U.S. PATENT DOCUMENTS

| | | | |
|---|---|---|---|
| 5,224,157 A | 6/1993 | Yamada et al. | |
| 5,243,382 A | 9/1993 | Takano et al. | |
| 5,257,069 A | 10/1993 | Hirata et al. | |
| 5,261,061 A | 11/1993 | Ju | |
| 5,270,775 A | 12/1993 | Suzuki | |
| 5,282,127 A | 1/1994 | Mii | |
| 5,291,244 A | 3/1994 | Kajiwara et al. | |
| 5,293,196 A | 3/1994 | Kaneko et al. | |
| 5,297,034 A | 3/1994 | Weinstein | |
| 5,297,256 A | 3/1994 | Wolstenholme et al. | |
| 5,300,980 A | 4/1994 | Maekawa et al. | |
| 5,303,005 A | 4/1994 | Takano et al. | |
| 5,305,055 A | 4/1994 | Ebner et al. | |
| 5,305,199 A | 4/1994 | LoBiondo et al. | |
| 5,307,263 A | 4/1994 | Brown | |
| 5,325,156 A | 6/1994 | Ulinski | |
| 5,333,286 A | 7/1994 | Weinberger et al. | |
| 5,335,048 A | 8/1994 | Takano et al. | |
| 5,339,168 A | 8/1994 | Evanitsky et al. | |
| 5,342,037 A | 8/1994 | Martin | |
| 5,347,346 A | 9/1994 | Shimizu et al. | |
| 5,359,391 A | 10/1994 | Kuroyanagi et al. | |
| 5,361,265 A | 11/1994 | Weinberger et al. | |
| 5,365,310 A | 11/1994 | Jenkins et al. | |
| 5,367,667 A | 11/1994 | Wahlquist et al. | |
| 5,369,469 A | 11/1994 | Leo et al. | |
| 5,369,471 A | 11/1994 | Yamada | |
| 5,369,472 A | 11/1994 | Raj et al. | |
| 5,373,349 A | 12/1994 | Ito | |
| 5,384,622 A | 1/1995 | Hirata et al. | |
| 5,386,271 A | 1/1995 | Maekawa et al. | |
| 5,392,095 A | 2/1995 | Siegel | |
| 5,398,257 A | 3/1995 | Groenteman | |
| 5,404,199 A | 4/1995 | Hirata et al. | |
| 5,412,779 A | 5/1995 | Motoyama | |
| 5,414,494 A | 5/1995 | Aikens et al. | |
| 5,420,667 A | 5/1995 | Kaneko et al. | |
| 5,424,808 A | 6/1995 | Maekawa et al. | |
| 5,424,844 A | 6/1995 | Koyanagi et al. | |
| 5,428,551 A | 6/1995 | Trainor et al. | |
| 5,430,709 A | 7/1995 | Galloway | |
| 5,434,650 A | 7/1995 | Nakahara et al. | |
| 5,442,541 A | 8/1995 | Hube et al. | |
| 5,444,517 A | 8/1995 | Nagashima | |
| 5,444,851 A | 8/1995 | Woest | |
| 5,446,522 A | 8/1995 | Tahara et al. | |
| 5,452,057 A | 9/1995 | Imaizumi et al. | |
| 5,459,552 A | 10/1995 | Ohira | |
| 5,463,775 A | 10/1995 | DeWitt et al. | |
| 5,469,353 A | 11/1995 | Pinsky et al. | |
| 5,485,142 A | 1/1996 | Stute et al. | |
| 5,488,454 A | 1/1996 | Fukada et al. | |
| 5,491,535 A | 2/1996 | Hirata et al. | |
| 5,493,364 A | 2/1996 | Kuroyanagi et al. | |
| 5,517,491 A | 5/1996 | Nanni et al. | |
| 5,528,691 A | 6/1996 | Rosauer et al. | |
| 5,530,899 A | 6/1996 | MacDonald | |
| 5,543,892 A | 8/1996 | Hirata et al. | |
| 5,548,376 A | 8/1996 | Kikuno | |
| 5,550,957 A | 8/1996 | Davidson, Jr. et al. | |
| 5,555,191 A | 9/1996 | Hripcsak | |
| 5,561,501 A | 10/1996 | Honma | |
| 5,572,672 A | 11/1996 | Dewitt et al. | |
| 5,579,087 A | 11/1996 | Salgado | |
| 5,586,254 A | 12/1996 | Kondo et al. | |
| 5,594,529 A | 1/1997 | Yamashita et al. | |
| 5,600,301 A | 2/1997 | Robinson, III | |
| 5,600,403 A | 2/1997 | Inoo | |
| 5,603,060 A | 2/1997 | Weinberger et al. | |
| 5,603,323 A | 2/1997 | Pflugrath et al. | |
| 5,619,024 A | 4/1997 | Kolls | |
| 5,619,716 A | 4/1997 | Nonaka et al. | |
| 5,631,724 A | 5/1997 | Sawada et al. | |
| 5,636,008 A | 6/1997 | LoBiondo et al. | |
| 5,636,333 A | 6/1997 | Davidson, Jr. et al. | |
| 5,638,427 A | 6/1997 | Flemming et al. | |
| 5,640,495 A | 6/1997 | Colbert et al. | |
| 5,642,202 A | 6/1997 | Williams et al. | |
| 5,642,208 A | 6/1997 | Takahashi et al. | |
| 5,655,084 A | 8/1997 | Pinsky et al. | |
| 5,659,794 A | 8/1997 | Caldarale et al. | |
| 5,673,190 A | 9/1997 | Kahleck et al. | |
| 5,675,744 A | 10/1997 | Tsujii | |
| 5,677,775 A | 10/1997 | Yamaguchi et al. | |
| 5,694,528 A | 12/1997 | Hube | |
| 5,696,903 A * | 12/1997 | Mahany | 709/228 |
| 5,699,494 A | 12/1997 | Colbert et al. | |
| 5,708,908 A | 1/1998 | Hirata et al. | |
| 5,708,909 A | 1/1998 | Yamashita et al. | |
| 5,715,393 A | 2/1998 | Naugle | |
| 5,715,496 A | 2/1998 | Sawada et al. | |
| 5,715,823 A | 2/1998 | Wood et al. | |
| 5,720,015 A | 2/1998 | Martin et al. | |
| 5,727,135 A | 3/1998 | Webb et al. | |
| 5,727,248 A | 3/1998 | Ogura | |
| 5,732,212 A | 3/1998 | Perholtz et al. | |
| 5,736,965 A | 4/1998 | Mosebrook et al. | |
| 5,740,801 A | 4/1998 | Branson | |
| 5,745,268 A | 4/1998 | Eastvold et al. | |
| 5,748,907 A | 5/1998 | Crane | |
| 5,752,125 A | 5/1998 | Yamashita et al. | |
| 5,752,128 A | 5/1998 | Yamashita | |
| 5,752,917 A | 5/1998 | Fuchs | |
| 5,761,529 A | 6/1998 | Raji et al. | |
| 5,764,918 A | 6/1998 | Poulter | |
| 5,768,516 A | 6/1998 | Sugishima | |
| 5,772,585 A | 6/1998 | Lavin et al. | |
| 5,774,052 A | 6/1998 | Hamm et al. | |
| 5,786,994 A | 7/1998 | Friz et al. | |
| 5,787,149 A | 7/1998 | Yousefi et al. | |
| 5,787,278 A | 7/1998 | Barton et al. | |
| 5,790,793 A | 8/1998 | Higley | |
| 5,790,977 A | 8/1998 | Exekiel | |
| 5,798,738 A | 8/1998 | Yamada | |
| 5,801,964 A | 9/1998 | McCarthy | |
| 5,809,237 A | 9/1998 | Watts et al. | |
| 5,812,397 A | 9/1998 | Pech et al. | |
| 5,812,874 A | 9/1998 | Yamashita et al. | |
| 5,818,603 A | 10/1998 | Motoyama | |
| 5,819,015 A | 10/1998 | Martin et al. | |
| 5,819,110 A | 10/1998 | Motoyama | |
| 5,822,221 A | 10/1998 | Groenteman | |
| 5,828,943 A | 10/1998 | Brown | |
| 5,835,816 A | 11/1998 | Sawada et al. | |
| 5,835,911 A | 11/1998 | Nakagawa et al. | |
| 5,844,550 A | 12/1998 | Trainor et al. | |
| 5,845,061 A | 12/1998 | Miyamoto et al. | |
| 5,845,230 A | 12/1998 | Lamberson | |
| 5,857,207 A | 1/1999 | Lo et al. | |
| 5,857,967 A | 1/1999 | Frid et al. | |
| 5,862,404 A | 1/1999 | Onaga | |
| 5,865,745 A | 2/1999 | Schmitt et al. | |
| 5,872,635 A | 2/1999 | Akiyama | |
| 5,872,928 A | 2/1999 | Lewis et al. | |
| 5,873,009 A | 2/1999 | Yamashita et al. | |
| 5,873,659 A | 2/1999 | Edwards et al. | |
| 5,878,746 A | 3/1999 | Lemelson et al. | |
| 5,880,677 A | 3/1999 | Lestician | |
| 5,884,072 A | 3/1999 | Rasmussen | |
| 5,887,216 A | 3/1999 | Motoyama | |
| 5,890,029 A | 3/1999 | Hirata et al. | |
| 5,894,416 A | 4/1999 | Kuroyanagi et al. | |
| 5,897,235 A | 4/1999 | Honma | |
| 5,901,286 A | 5/1999 | Danknick et al. | |
| 5,905,906 A | 5/1999 | Goffinet et al. | |
| 5,909,493 A | 6/1999 | Motoyama et al. | |
| 5,911,095 A | 6/1999 | Atsumi et al. | |
| 5,917,405 A | 6/1999 | Joao | |
| 5,933,675 A | 8/1999 | Sawada et al. | |
| 5,935,060 A | 8/1999 | Iliff | |
| 5,956,487 A | 9/1999 | Venkatraman et al. | |
| 5,956,698 A | 9/1999 | Lachese et al. | |
| 5,968,116 A | 10/1999 | Day et al. | |
| 5,970,149 A | 10/1999 | Johnson | |
| 5,974,234 A | 10/1999 | Levine et al. | |
| 5,975,737 A | 11/1999 | Crater et al. | |
| 5,991,810 A * | 11/1999 | Shapiro et al. | 709/229 |

| | | | |
|---|---|---|---|
| 6,003,061 A | 12/1999 | Jones et al. |
| 6,003,070 A | 12/1999 | Frantz |
| 6,003,078 A | 12/1999 | Kodimer et al. |
| 6,006,045 A | 12/1999 | Miyawaki |
| 6,009,274 A | 12/1999 | Fletcher et al. |
| 6,009,284 A | 12/1999 | Weinberger et al. |
| 6,012,088 A | 1/2000 | Li et al. |
| 6,014,631 A | 1/2000 | Teagarden et al. |
| 6,014,691 A | 1/2000 | Brewer et al. |
| 6,021,284 A | 2/2000 | Serizawa et al. |
| 6,022,315 A | 2/2000 | Iliff |
| 6,023,223 A | 2/2000 | Baxter, Jr. |
| 6,023,507 A | 2/2000 | Wookey |
| 6,025,925 A | 2/2000 | Davidson, Jr. et al. |
| 6,031,964 A | 2/2000 | Anderson |
| 6,041,041 A * | 3/2000 | Ramanathan et al. ........ 370/241 |
| 6,042,111 A | 3/2000 | Rivers et al. |
| 6,060,994 A | 5/2000 | Chen |
| 6,061,603 A | 5/2000 | Papadopolous et al. |
| 6,064,915 A | 5/2000 | Kaneko et al. |
| 6,088,718 A | 7/2000 | Altschuler et al. |
| 6,091,915 A | 7/2000 | Takagishi |
| 6,098,116 A | 8/2000 | Nixon et al. |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,119,934 A | 9/2000 | Kolls |
| 6,122,463 A | 9/2000 | Nagatani |
| 6,125,363 A | 9/2000 | Buzzeo et al. |
| 6,130,999 A | 10/2000 | Serizawa et al. |
| 6,139,177 A | 10/2000 | Venkatraman et al. |
| 6,152,365 A | 11/2000 | Kolls |
| 6,161,145 A * | 12/2000 | Bainbridge et al. .......... 709/246 |
| 6,167,448 A | 12/2000 | Hemphill et al. |
| 6,175,866 B1 | 1/2001 | Holloway et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,205,466 B1 | 3/2001 | Karp et al. |
| 6,209,048 B1 | 3/2001 | Wolff |
| 6,221,011 B1 | 4/2001 | Bardy |
| 6,226,650 B1 * | 5/2001 | Mahajan et al. ............... 707/625 |
| 6,230,199 B1 | 5/2001 | Revashetti et al. |
| 6,246,485 B1 | 6/2001 | Brown et al. |
| 6,256,378 B1 | 7/2001 | Iggulden et al. |
| 6,256,668 B1 | 7/2001 | Slivka et al. |
| 6,260,148 B1 | 7/2001 | Aggarwal et al. |
| 6,260,248 B1 | 7/2001 | Cramer et al. |
| 6,282,454 B1 | 8/2001 | Papadopolous et al. |
| 6,282,711 B1 | 8/2001 | Halpern et al. |
| 6,286,038 B1 | 9/2001 | Reichmeyer et al. |
| 6,286,059 B1 | 9/2001 | Sugiura |
| 6,292,828 B1 | 9/2001 | Williams |
| 6,295,527 B1 | 9/2001 | McCormack et al. |
| 6,298,457 B1 | 10/2001 | Rachlin et al. |
| 6,304,895 B1 | 10/2001 | Schneider et al. |
| 6,308,099 B1 | 10/2001 | Fox et al. |
| 6,311,024 B1 | 10/2001 | Serizawa et al. |
| 6,312,378 B1 | 11/2001 | Bardy |
| 6,317,570 B1 | 11/2001 | Uchida et al. |
| 6,317,783 B1 | 11/2001 | Freishtat et al. |
| 6,317,848 B1 | 11/2001 | Sorens et al. |
| 6,325,540 B1 | 12/2001 | Lounsberry et al. |
| 6,327,594 B1 | 12/2001 | Van Huben et al. |
| 6,343,320 B1 | 1/2002 | Fairchild et al. |
| 6,356,933 B2 | 3/2002 | Mitchell et al. |
| 6,356,949 B1 | 3/2002 | Katsandres et al. |
| 6,366,741 B1 | 4/2002 | Fukushima |
| 6,368,284 B1 | 4/2002 | Bardy |
| 6,370,436 B1 | 4/2002 | Howard et al. |
| 6,370,582 B1 | 4/2002 | Lim et al. |
| 6,377,162 B1 | 4/2002 | Delestienne et al. |
| 6,381,557 B1 | 4/2002 | Babula et al. |
| 6,381,712 B1 | 4/2002 | Nemitz |
| 6,397,212 B1 | 5/2002 | Biffar |
| 6,405,310 B1 | 6/2002 | Simpson |
| 6,406,426 B1 | 6/2002 | Reuss et al. |
| 6,412,026 B1 | 6/2002 | Graf |
| 6,415,023 B2 | 7/2002 | Iggulden |
| 6,415,392 B1 | 7/2002 | Suzuki et al. |
| 6,421,671 B1 | 7/2002 | Bryan et al. |
| 6,421,719 B1 | 7/2002 | Lewis et al. |
| 6,426,798 B1 | 7/2002 | Yeung |
| 6,430,612 B1 | 8/2002 | Iizuka |
| 6,430,711 B1 | 8/2002 | Sekizawa |
| 6,434,572 B2 | 8/2002 | Derzay et al. |
| 6,437,692 B1 | 8/2002 | Petite et al. |
| 6,446,192 B1 | 9/2002 | Narasimhan et al. |
| 6,449,633 B1 | 9/2002 | Van et al. |
| 6,449,663 B1 | 9/2002 | Carney et al. |
| 6,453,127 B2 | 9/2002 | Wood et al. |
| 6,453,129 B1 | 9/2002 | Simpson et al. |
| 6,457,038 B1 | 9/2002 | Defosse |
| 6,462,831 B1 | 10/2002 | Akiyama |
| 6,466,971 B1 | 10/2002 | Humpleman et al. |
| 6,467,084 B1 | 10/2002 | Howard et al. |
| 6,471,521 B1 | 10/2002 | Dornbush et al. |
| 6,477,117 B1 | 11/2002 | Narayanaswami et al. |
| 6,479,792 B1 | 11/2002 | Beiermann et al. |
| 6,487,513 B1 | 11/2002 | Eastvold et al. |
| 6,493,517 B1 | 12/2002 | Hanson |
| 6,493,871 B1 | 12/2002 | McGuire et al. |
| 6,494,831 B1 | 12/2002 | Koritzinsky |
| 6,510,350 B1 | 1/2003 | Steen et al. |
| 6,523,013 B2 | 2/2003 | Shah et al. |
| 6,523,063 B1 | 2/2003 | Miller et al. |
| 6,523,130 B1 | 2/2003 | Hickman et al. |
| 6,529,848 B2 | 3/2003 | Sone |
| 6,549,612 B2 | 4/2003 | Gifford et al. |
| 6,553,336 B1 | 4/2003 | Johnson et al. |
| 6,553,490 B1 | 4/2003 | Kottapurath et al. |
| 6,559,965 B1 | 5/2003 | Simpson et al. |
| 6,560,611 B1 | 5/2003 | Nine et al. |
| 6,560,641 B1 | 5/2003 | Powderly et al. |
| 6,560,656 B1 | 5/2003 | O'Sullivan et al. |
| 6,564,227 B1 | 5/2003 | Sakakibara et al. |
| 6,574,729 B1 | 6/2003 | Fink et al. |
| 6,581,092 B1 | 6/2003 | Motoyama et al. |
| 6,581,094 B1 | 6/2003 | Gao |
| 6,587,812 B1 | 7/2003 | Takayama |
| 6,587,879 B1 | 7/2003 | Reynolds |
| 6,591,272 B1 | 7/2003 | Williams |
| 6,598,011 B1 | 7/2003 | Howards Koritzinsky et al. |
| 6,598,083 B1 | 7/2003 | Remer et al. |
| 6,601,159 B1 | 7/2003 | Smith et al. |
| 6,604,212 B2 | 8/2003 | Sekizawa et al. |
| 6,609,108 B1 | 8/2003 | Pulliam et al. |
| 6,611,863 B1 | 8/2003 | Banginwar |
| 6,631,407 B1 | 10/2003 | Mukaiyama et al. |
| 6,636,899 B1 | 10/2003 | Rabb et al. |
| 6,643,650 B1 | 11/2003 | Slaughter et al. |
| 6,651,110 B1 | 11/2003 | Caspers et al. |
| 6,651,190 B1 | 11/2003 | Worley et al. |
| 6,654,720 B1 | 11/2003 | Graham et al. |
| 6,654,726 B1 | 11/2003 | Hanzek |
| 6,665,425 B1 | 12/2003 | Sampath et al. |
| 6,670,810 B2 | 12/2003 | Duncan et al. |
| 6,681,344 B1 | 1/2004 | Andrew |
| 6,681,349 B2 | 1/2004 | Sekizawa |
| 6,686,838 B1 | 2/2004 | Rezvani et al. |
| 6,687,848 B1 | 2/2004 | Najmi |
| 6,687,873 B1 | 2/2004 | Ballantyne et al. |
| 6,691,106 B1 | 2/2004 | Sathyanarayan |
| 6,704,807 B1 | 3/2004 | Mathur et al. |
| 6,710,893 B1 | 3/2004 | Hou et al. |
| 6,711,593 B1 | 3/2004 | Gordon et al. |
| 6,711,618 B1 | 3/2004 | Danner et al. |
| 6,717,513 B1 | 4/2004 | Sandelman et al. |
| 6,725,281 B1 | 4/2004 | Zintel et al. |
| 6,738,798 B1 | 5/2004 | Ploetz et al. |
| 6,754,664 B1 | 6/2004 | Bush |
| 6,757,714 B1 | 6/2004 | Hansen |
| 6,757,899 B2 | 6/2004 | Zhdankin et al. |
| 6,775,238 B1 * | 8/2004 | Suzuki .......................... 370/242 |
| 6,779,004 B1 | 8/2004 | Zintel |
| 6,782,542 B1 | 8/2004 | Mein et al. |

| | | |
|---|---|---|
| 6,785,015 B1 | 8/2004 | Smith et al. |
| 6,792,337 B2 | 9/2004 | Blackett et al. |
| 6,804,712 B1 | 10/2004 | Kracht |
| 6,823,397 B2 | 11/2004 | Rawson, III |
| 6,831,555 B1 | 12/2004 | Miller et al. |
| 6,832,239 B1 | 12/2004 | Kraft et al. |
| 6,832,373 B2 | 12/2004 | O'Neill |
| 6,834,298 B1 | 12/2004 | Singer et al. |
| 6,842,903 B1 | 1/2005 | Weschler |
| 6,857,013 B2 | 2/2005 | Ramberg et al. |
| 6,904,593 B1 | 6/2005 | Fong et al. |
| 6,925,335 B2 | 8/2005 | May et al. |
| 6,940,405 B2 | 9/2005 | Script et al. |
| 6,963,899 B1 | 11/2005 | Fernandez et al. |
| 6,972,676 B1 | 12/2005 | Kimmel et al. |
| 6,973,491 B1 | 12/2005 | Staveley et al. |
| 6,985,779 B2 | 1/2006 | Hsiung et al. |
| 6,990,395 B2 | 1/2006 | Ransom et al. |
| 7,003,574 B1 | 2/2006 | Bahl |
| 7,016,966 B1 | 3/2006 | Saulpaugh et al. |
| 7,020,706 B2 | 3/2006 | Cates et al. |
| 7,028,081 B2 | 4/2006 | Kawashima |
| 7,028,312 B1 | 4/2006 | Merrick et al. |
| 7,032,005 B2 | 4/2006 | Mathon et al. |
| 7,046,134 B2 | 5/2006 | Hansen |
| 7,057,724 B1 | 6/2006 | Mead et al. |
| 7,065,576 B2 | 6/2006 | Kamel et al. |
| 7,072,946 B2 | 7/2006 | Shafer |
| 7,079,010 B2 | 7/2006 | Champlin |
| 7,080,267 B2 | 7/2006 | Gary et al. |
| 7,082,426 B2 | 7/2006 | Musgrove et al. |
| 7,082,460 B2 | 7/2006 | Hansen et al. |
| 7,085,814 B1 | 8/2006 | Gandhi et al. |
| 7,089,567 B2 | 8/2006 | Girardot et al. |
| 7,091,846 B2 | 8/2006 | Wu |
| 7,092,370 B2 | 8/2006 | Jiang et al. |
| 7,103,357 B2 | 9/2006 | Kirani et al. |
| 7,113,988 B2 | 9/2006 | Chirashya et al. |
| 7,116,681 B1 | 10/2006 | Hovell et al. |
| 7,117,239 B1 | 10/2006 | Hansen |
| 7,142,839 B2 | 11/2006 | Pelaez et al. |
| 7,149,792 B1 | 12/2006 | Hansen |
| 7,158,483 B1 | 1/2007 | Takabatake et al. |
| 7,178,149 B2 | 2/2007 | Hansen |
| 7,185,014 B1 | 2/2007 | Hansen |
| 7,200,578 B2 | 4/2007 | Paltenghe et al. |
| 7,254,601 B2 | 8/2007 | Baller et al. |
| 7,266,526 B1 | 9/2007 | Drummond et al. |
| 7,421,484 B2 | 9/2008 | Das |
| 7,506,048 B1 | 3/2009 | Motoyama |
| 7,529,767 B2 | 5/2009 | DeAnna et al. |
| 7,937,370 B2 * | 5/2011 | Hansen .................. 707/656 |
| 7,966,418 B2 * | 6/2011 | Shedrinsky ............. 709/237 |
| 8,055,758 B2 * | 11/2011 | Hansen .................. 709/224 |
| 8,060,886 B2 | 11/2011 | Hansen |
| 8,108,543 B2 * | 1/2012 | Hansen .................. 709/232 |
| 2001/0007117 A1 | 7/2001 | Cooper et al. |
| 2001/0011250 A1 | 8/2001 | Paltenghe et al. |
| 2001/0025377 A1 | 9/2001 | Hinderks |
| 2001/0027439 A1 | 10/2001 | Holtzman et al. |
| 2001/0049690 A1 | 12/2001 | McConnell et al. |
| 2001/0052999 A1 | 12/2001 | Hiraoka et al. |
| 2002/0006790 A1 | 1/2002 | Blumenstock et al. |
| 2002/0019844 A1 | 2/2002 | Kurowski et al. |
| 2002/0026514 A1 | 2/2002 | Ellis et al. |
| 2002/0032470 A1 | 3/2002 | Linberg |
| 2002/0032720 A1 | 3/2002 | Nelson et al. |
| 2002/0035533 A1 | 3/2002 | Mache et al. |
| 2002/0038320 A1 | 3/2002 | Brook |
| 2002/0054169 A1 | 5/2002 | Richardson |
| 2002/0059489 A1 | 5/2002 | Davis et al. |
| 2002/0064138 A1 | 5/2002 | Saito et al. |
| 2002/0078135 A1 | 6/2002 | Venkatsubra |
| 2002/0078259 A1 | 6/2002 | Wendorf et al. |
| 2002/0080391 A1 | 6/2002 | Sugiura et al. |
| 2002/0095600 A1 | 7/2002 | Deen |
| 2002/0116550 A1 | 8/2002 | Hansen |
| 2002/0133753 A1 | 9/2002 | Mayberry et al. |
| 2002/0135801 A1 | 9/2002 | Tessman |
| 2002/0138567 A1 | 9/2002 | Ogawa |
| 2002/0144016 A1 | 10/2002 | Spicer et al. |
| 2002/0157090 A1 | 10/2002 | Anton, Jr. |
| 2002/0174085 A1 | 11/2002 | Nelson et al. |
| 2002/0178241 A1 | 11/2002 | Eriksson |
| 2003/0014733 A1 | 1/2003 | Ringseth et al. |
| 2003/0023957 A1 | 1/2003 | Bau et al. |
| 2003/0025931 A1 | 2/2003 | Dorfman et al. |
| 2003/0056140 A1 | 3/2003 | Taylor et al. |
| 2003/0061403 A1 | 3/2003 | Miyata et al. |
| 2003/0063309 A1 | 4/2003 | Parry |
| 2003/0070006 A1 | 4/2003 | Nadler et al. |
| 2003/0072027 A1 | 4/2003 | Haines et al. |
| 2003/0118353 A1 | 6/2003 | Baller |
| 2003/0136837 A1 * | 7/2003 | Amon et al. .................. 235/435 |
| 2003/0140234 A1 * | 7/2003 | Noda et al. .................. 713/186 |
| 2003/0154284 A1 | 8/2003 | Bernardin et al. |
| 2003/0158897 A1 | 8/2003 | Ben-Natan et al. |
| 2003/0158919 A1 | 8/2003 | Fomenko |
| 2003/0200285 A1 | 10/2003 | Hansen et al. |
| 2003/0200329 A1 | 10/2003 | Delaney |
| 2003/0229529 A1 | 12/2003 | Mui et al. |
| 2003/0229785 A1 | 12/2003 | Daseke et al. |
| 2004/0027373 A1 | 2/2004 | Jacquot et al. |
| 2004/0098515 A1 | 5/2004 | Rezvani et al. |
| 2004/0128370 A1 | 7/2004 | Kortright |
| 2004/0152450 A1 | 8/2004 | Brasher et al. |
| 2004/0177124 A1 | 9/2004 | Hansen |
| 2004/0186693 A1 | 9/2004 | Xiang et al. |
| 2004/0215605 A1 * | 10/2004 | Mester .................. 707/3 |
| 2004/0221026 A1 | 11/2004 | Dorland |
| 2005/0005152 A1 | 1/2005 | Singh et al. |
| 2005/0015501 A1 | 1/2005 | Kaplan et al. |
| 2005/0021772 A1 | 1/2005 | Shedrinski |
| 2005/0033588 A1 | 2/2005 | Ruiz et al. |
| 2005/0055397 A1 | 3/2005 | Zhu et al. |
| 2005/0086172 A1 | 4/2005 | Stefik |
| 2005/0102388 A1 | 5/2005 | Tabbara et al. |
| 2005/0119930 A1 * | 6/2005 | Simon .................. 705/9 |
| 2005/0144612 A1 | 6/2005 | Wang et al. |
| 2005/0154787 A1 | 7/2005 | Cochran et al. |
| 2005/0193099 A1 | 9/2005 | Reus et al. |
| 2005/0193386 A1 | 9/2005 | McCaleb et al. |
| 2005/0198245 A1 * | 9/2005 | Burgess et al. ............... 709/223 |
| 2005/0246702 A1 | 11/2005 | Yeh et al. |
| 2005/0256614 A1 | 11/2005 | Habermas |
| 2005/0262076 A1 | 11/2005 | Voskuil |
| 2006/0031237 A1 * | 2/2006 | DeAnna et al. ............... 707/100 |
| 2006/0031476 A1 | 2/2006 | Mathes et al. |
| 2006/0037022 A1 | 2/2006 | Byrd et al. |
| 2006/0059239 A1 | 3/2006 | Brasher et al. |
| 2006/0069753 A1 | 3/2006 | Hu et al. |
| 2006/0077941 A1 | 4/2006 | Alagappan et al. |
| 2006/0087408 A1 | 4/2006 | Korzeniowski |
| 2006/0087409 A1 | 4/2006 | Korzeniowski |
| 2006/0095370 A1 | 5/2006 | Seth et al. |
| 2006/0100972 A1 | 5/2006 | Chianese et al. |
| 2006/0135192 A1 | 6/2006 | Surendra et al. |
| 2006/0179143 A1 | 8/2006 | Walker et al. |
| 2006/0200307 A1 | 9/2006 | Riess |
| 2006/0200494 A1 | 9/2006 | Sparks |
| 2006/0224742 A1 | 10/2006 | Shabazi et al. |
| 2006/0236325 A1 | 10/2006 | Rao et al. |
| 2006/0282521 A1 | 12/2006 | Anderson et al. |
| 2007/0005736 A1 | 1/2007 | Hansen et al. |
| 2007/0011295 A1 | 1/2007 | Hansen |
| 2007/0077075 A1 * | 4/2007 | Kim .................. 455/411 |
| 2007/0078976 A1 * | 4/2007 | Taylor et al. .................. 709/224 |
| 2007/0094076 A1 | 4/2007 | Perkowski et al. |
| 2007/0100892 A1 | 5/2007 | Kephart et al. |
| 2007/0150903 A1 | 6/2007 | Hansen |
| 2007/0198661 A1 | 8/2007 | Hansen |
| 2007/0203952 A1 | 8/2007 | Baron et al. |
| 2007/0288629 A2 * | 12/2007 | Taylor et al. .................. 709/224 |
| 2007/0294237 A1 | 12/2007 | John et al. |
| 2008/0005321 A1 * | 1/2008 | Ma et al. .................. 709/224 |
| 2008/0063149 A1 | 3/2008 | West et al. |
| 2008/0065757 A1 * | 3/2008 | Motoyama et al. ........... 709/224 |
| 2008/0082657 A1 | 4/2008 | Hart et al. |

| | | | |
|---|---|---|---|
| 2008/0154957 | A1 | 6/2008 | Taylor et al. |
| 2008/0231414 | A1* | 9/2008 | Canosa .................. 340/3.1 |
| 2009/0013064 | A1 | 1/2009 | Taylor et al. |
| 2012/0143970 | A1* | 6/2012 | Hansen .................. 709/206 |
| 2012/0158914 | A1* | 6/2012 | Hansen .................. 709/219 |
| 2012/0158982 | A1* | 6/2012 | Hansen .................. 709/230 |

FOREIGN PATENT DOCUMENTS

| | | |
|---|---|---|
| EP | 1 362 282 | 11/2003 |
| EP | 1 695 485 | 8/2006 |
| FR | 2797728 | 2/2001 |
| GB | 2305820 | 4/1997 |
| JP | 60-263162 | 12/1985 |
| JP | 06-062130 | 3/1994 |
| JP | 07-325513 | 12/1995 |
| JP | 09-163008 | 6/1997 |
| JP | 09-305407 | 11/1997 |
| JP | 09-325925 | 12/1997 |
| JP | 10-190922 | 7/1998 |
| JP | 10-224372 | 8/1998 |
| JP | 11-045195 | 2/1999 |
| JP | 11-203079 | 7/1999 |
| JP | 11-296453 | 10/1999 |
| JP | 2000-112863 | 4/2000 |
| JP | 2000-122952 | 4/2000 |
| JP | 2000-163283 | 6/2000 |
| JP | 2000-278773 | 10/2000 |
| JP | 2000-309145 | 11/2000 |
| JP | 2001-337817 | 12/2001 |
| JP | 2003-223603 | 8/2003 |
| WO | WO97/30879 | 8/1997 |
| WO | WO98/20439 | 5/1998 |
| WO | WO98/33302 | 7/1998 |
| WO | WO98/38910 | 9/1998 |
| WO | WO98/41943 | 9/1998 |
| WO | WO99/21336 | 4/1999 |
| WO | WO99/57649 | 11/1999 |
| WO | WO99/57837 | 11/1999 |
| WO | WO99/57838 | 11/1999 |
| WO | WO99/64958 | 12/1999 |
| WO | WO00/23894 | 4/2000 |
| WO | WO02/10919 | 2/2002 |
| WO | WO02/21239 | 3/2002 |
| WO | WO02/21299 | 3/2002 |
| WO | WO02/21414 | 3/2002 |
| WO | WO02/21415 | 3/2002 |
| WO | WO02/21777 | 3/2002 |
| WO | WO02/25501 | 3/2002 |
| WO | WO03/021464 | 3/2003 |
| WO | WO03/054439 | 7/2003 |
| WO | WO2004/059447 | 7/2004 |
| WO | WO2006/009402 | 1/2006 |
| WO | WO2008/083177 | 7/2008 |

OTHER PUBLICATIONS

24×7, HealthTech Publishing Company, Inc. (Nov. 1996).
"Remote Diagnostics: Strategic weapon in the war for multi-vendor service contracts," Tech Assessment, vol. 3, No. 12, Dec. 1995.
"Siemens Medical, BJC Health System Extend deal to multivendor service," Medical Imaging News, vol. 6, No. 26, Jun. 27, 1997.
Dec. 27, 1995, SCAN Diagnostic Imaging, vol. 8, No. 24.
Apr. 22, 2005 Literature Search by Keyword: CyberTAC.
Adelberg, D., "Building Robust Wrappers for Text Sources", [online] Retrieved from the Internet:<URL:http://student.bu.ac.bd/~mumit/Research/NLP-bib/papers/Adelberg99.pdf> [retrieved on Nov. 24, 2008] (1999).
Allegro Software product release 1-61 overview Greenhills Software Inc., [online] Jun. 10, 2002, pp. I-I, XPOO2201939 Retrieved from the Internet: <URL:http://www.ghs.com/partners/allegro/> [retrieved on Jun. 10, 2002] the whole document.
Allegro, RomWebCLient Embedded HTTP client Toolkit: Allegrosoft, Circuit Cellar Online, Sep. 7, 2000, pp. 1-2, XP-002201983, URL:http://web.archive.orgweb/20000709204234/http://www.allegrosoft.com/romwebclient.html.
Bock, G., "Mainstreaming XML-based Enterprise Applications: Using Oracle XML DB to Manage Financial Information within a Global Banking System", Oracle Corporation, (C) 2003.
Box, et al., Simple Object Acces Protocol (SOAP) 1.1, Document No. XP002250270, May 8, 2000.
Chandler, T. et al., "The Technology Development of Automatic Metering and Monitoring Systems", Int'l Power Engineering Conf. 2005, IEEE, 4 pgs.
Cheung, D. et al., "Distributed and Scalable XML Document Processing Architecture for E-Commerce Systems", Adv. Issues of E-Commerce and Web-Based Information Systems, WECWIS 2000, 2nd Int'l Workshop, (Jun. 2000), pp. 152-157.
Ennis, D., "CORBA and XML Integration in Enterprise Systems", IONA Technologies Inc.[online], Retrieved from the Internet:<URL:http://citeseer.ist.psu.edu/cache/papers/cs/16013/http:zSzzSzwww.iona.comzSzinfozSztechcenterzSzecoop2000apr17.pdf/ennis00corba.pdf> [retrieved on Nov. 24, 2008] (2000).
CyberTAC & RadScape Presentation (May 1997).
CyberTAC Design Presentation (1997).
CyberTAC from Virtual Impact Systems, Inc. Presentation (1997).
CyberTAC Remote Support System Presentation (1997).
Database WIP, Section EI, Week 200156, Abstract, Document No. XP002253876 (Korea Electronics & Telecom Res Inst.) Derwent Publications, Ltd., London, GB, (Mar. 2001).
Eastvold, Roger, "Services: The Next Generation," The Professional Journal, vol. 20, No. 4.
Eastvold, Roger, "Tiss and Tell," Medical Imaging, Sep. 1995.
EBITS:Electronic Business & Information Technology for Society Research Consortium, Proposal for Development of an Educational and Research Infrastructure for Safe Electronic Commerce, [online] Retrieved from the Internet:<URL:http://www.cs.dartmouth.edu/~makedon/cs188/proposal.html>, [retrieved Feb. 15, 2005].
Jiang, et al., "Record-Boundary Discovery in Web Documents", [online] Retrieved from the Internet:<URL:http://osm7.cs.byu.edu/deg/papers/SJ.Thesis.ps>, [retrieved on Nov. 24, 2008] (1998).
Emmerich et al., Implementing Incremental Code Migration with XML, IEEE, 4-11, (Jun. 2000).
EmWare Press Release: "emWare Announces Support for Sun Microsystems Jini Technology," Salt Lake City, UT (Feb. 1999).
EmWare Press Release: "emWare Delivers EMIT 3.0 SDK Pro-A Complete Device Networking Kit for Developing End-to-end, Embedded Device Networking Solutions," Salt Lake City, UT (May 1999).
EmWare Press Release: "emWare, IBM Demonstrate Next Phase in Establishing Worldwide Access to Embedded Devices," Chicago, IL (Mar. 1999).
EmWare Press Release: "emWare's emLink (TM) Used to Internet-enable Welch Allyn's Vital Signs Monitor," Chicago, IL (Mar. 1999).
EmWare Press Release: "Invensys Selects emWare EMIT Device-Networking Software to Add Remote Monitoring and Control Capabilities to its Controller Products," Salt Lake City, UT (Jun. 1999).
EmWare Press Release: "Motorola, Mitsubishi and National Semiconductor Join emWare's Embed the Internet Alliance," Chicago, IL (Mar. 1999).
Franklin, M. et al., "Data in Your Face: PUSH Technology in Perspective", Proc. ACM SIGMOD Int'l Conf. on Mgmt of Data, (Jun. 1998), #XP000886180, pp. 516-519.
Hanckmann, J., "Telescript: The Emerging Standard for Intelligent Messaging," Philips Telecommunications Review, vol. 52(1), pp. 15-19 (Mar. 1994).
Universal Plug & Play Device Architecture, (C) Microsoft Corporation (Jun. 8, 2000), [online] Retrieved from the Internet: <URL:http://www.upnp.org/specs/arch/upnpda10_20000613.htm>, [retrieved on Nov. 24, 2008].
Incremona, A. "Remote Service Diagnostics for Imaging Equipment: Today and Tomorrow," Advanced Imaging, 12(9):90(2) (1997).
Jennyc, Kenn S., "Linking Enterprise Business Systems to the Factory Floor," The Hewlett-Packard Journal, Article 9 (May 1998).
Kafeza, E. et al., "Alerts in Mobile Healthcare Applications: Requirements and Pilot Study", IEEE, vol. 8, No. 2, pp. 173-181 (Jun. 2004).
Kimball, R., "XML Will Make it Easier," Intelligent Enterprise, [online] Retrieved from the Internet:<URL:http://www.intelligententerprise.com/010416/webhouse1_1.jhtml> [retrieved on Nov. 24, 2008] (Apr. 16, 2001).

Koppen, E., et al., "Active Hypertext for Distributed Web Applications", Enabling Technologies: Infrastructure for Collaborative Enterprises, (WET ICE '99), Proc. IEEE 8th Int'l. Workshop (1999), pp. 297-302.
Kovar, J., "Xerox Unveils Expanded Channel Lineup; Also Plans to Introduce E-Mail, Queue Management Software," PC Expo,(Jun. 1999).
Lassman, M. et al., "Modern Nuclear Medical Diagnostics with Efficient Gamma Cameras," Electromedica, 66(2):43-51, (1998).
Lewandowska, J., et al., "System for Grouping Technologically Similar Devices", v. 48 n 12; (Dec. 1975), pp. 636-638 (English Abstract).
Layman, et al., "XML-Data," Position Paper from Microsoft Corp. (Jun. 1997), [online] Retrieved from the Internet:<URL:http://www.oasis-open.org/cover/xml-data9706223.html> [retrieved on Sep. 2, 2004].
Lerner, R., "At the Forge: Introducing SOAP", Linux Journal, #XP002292162 (Mar. 2001).
Lindley, D., "Xerox unveils copier that phones for help," Rochester Democrat and Chronicle, (Mar. 28, 1990).
Luh, James C., "With several specs complete, XML enters widespread development," Internet World, (Jan. 4, 1999).
Martin, D., "Protessional XML"., WROX Press Ltd., pub., Ch. 11, 'Server to Server', pp. 559-562, 819-820 (2000).
Mason, K., "XML Translation for block structured languages", IBM Corporation: Research Disclosure, Kenneth Mason Publications, 44176 (2001).
Math Markup Language (Chapter 4); [online] Retrieved from the Internet:<URL:http://www.w3.org/TR/REC-MathML/chap4_4.html>, [retrieved on Feb. 15, 2005].
McBride, R.A., "Security Considerations for Active Messages," ACM SIGICE Bulletin, vol. 22 (2), (Oct. 1996).
Memphis Educational Computer Connectivity Alliance (MECCA), [online] Retrieved from the Internet:<URL:http://www.mecca.org/~ltague/nsfnocostextension.html>, [retrieved on Feb. 15, 2005].
Mills et al., "A knowledge-based method for inferring semantic concepts from visual models of system behavior," ACM (Jul. 2000), pp. 306-337.
Orasis Medical Services, Inc., Business Plan Copy No. 001, (Nov. 1995).
Pfeiffer, R., "XML Tutorials for Programmers: Tutorial 2: Writing XML Documents," (1999) [online] Retrieved from the Internet:<URL:http://imb.com/xml>, [retrieved on Mar. 2, 1999].
Questra Applications Data Sheet (2002).
Questra Preliminary Invalidity Contentions, dated Apr. 29, 2005.
Reagan, K., "Technology for the Soul," OC Metro, (Sep. 1, 1995).
Rytting, T., "Dispensing the Goods, Embedded Style," Circuit Cellar Online, (Oct. 1999).
Schmidt, The Evolution of Workflow Standards, IEEE (1999).
SOAP Archives Online, "Multiple Method Calls in SOAP Packet"; [online] Retrieved from the Internet:<URL:http://discuss.develop.com/archives/wa.exe?A2=ind9912&L=soap&T=O&F=&S=&P=25113>, [retrieved on Dec. 8, 2000].
Steinfeld, E., "From Standalone to Internet Appliance", Circuit Cellar Online, [online] (Jul. 9, 2000), #XP002201938, Retrieved from the Internet:<URL:http://web.archive.org/web/20000709204234/http://www.alegrosoft.com/romwebclient.html>retrieved on Jun. 12, 2002 the whole document.
Steinfeld, E., "Internet-appliance technology automates test equipment" EDN Magazine, pp. 157-169, Oct. 2000, www.edbmag.com.
Suresh et al., "XML-based Data System for Earth Science Applications", IEEE 2000 International, vol. 3, pp. 242-28, Jul. 2000.
Searls, "The Next Bang: The Expolosive Combination of Embedded Linux, XML, and Instant Mess.", ACM (Sep. 2000) Issue 77 [online] Retrieved from the Internet:<URL:http://www.linuxjournal.com/article.php?sid=4195>, [retrieved on Nov. 20, 2001].
The Simple Times, vol. 7, No. 1, Mar. 1999; [online] Retrieved from the Internet:<URL:http://www.simple-times.org/pub/simple-times/issues/7-1.html> [retrieved on Aug. 3, 2005].
Trewitt, G., "Using Tcl to Process HTML Forms," Digital Network Systems Laboratory, NSL Technical Note TN-14, Palo Alto, CA (Mar. 1994).
Virtual Reality Transfer Protocol (VRTP); Retrieved from the Internet:<URL:http://www.stl.nps.navy.mil/~brutzman/vrtp> (1998).
Walsh, Norman, "XSL the Extensible Style Language: Styling XML Documents," New Architect Daily, Jan. 1999.
Webmethods B2B Whitepaper; [online] Retrieved from the Internet:<URL:http://www.cs.wisc.edu/~vganti/papers/b2b_wpB2Bintegration.html> (1999).
White Paper, Medical Imaging, East Providence, RI (Sep. 1995).
Wigget, Jeremy, "Intraview: Roger Eastvold of Orasis Inc.," 24×7, Nov. 1996.
Williams, T., "Java Goes to Work Controlling Networked Embedded Systems" Computer Design, Pennwell Publ. Littleton, MA, 35:9:36-37, Aug. 1996.
Winer, Dave, "XML-RPC Specification," (http://XML-RPC.com), Jun. 15, 1999.
Winter 1992, Field of View, vol. 2, No. 3, Toshiba America Medical System, Inc.
Wu et al., "A knowledge sharing and collaboration system model based on Internet", Systems, Man, and Cybernetics, 1999. IEEE SMC'99 Conference Proceedings, vol. 2, pp. 148-152 (1999).
Xerox 190 Copier, Electronic Data Interface Operator Guide, ver. 1.0, (1989).
Van der Werff, M., et al., "A Mobile-Based Home Automatic System", IEEE Mobility Conference (2005).
Examination Report in EP Application No. 01955993.9, dated Jan. 29, 2004.
Examination Report in EP Application No. 01955993.9, dated Aug. 5, 2004.
Examination Report in EP Application No. 01955993.9, dated Dec. 16, 2004.
Examination Report in EP Application No. 01973431.8, dated Mar. 8, 2005.
Communication in EP Application No. 01973431.8, dated Mar. 30, 2005.
Examination Report in EP Application No. 01973431.8, dated Jan. 15, 2008.
Office Action in EP Application No. 01996048.3, dated Jun. 22, 2004.
Office Action in EP Application No. 01996048.3, dated Mar. 11, 2005.
Office Action in EP Application No. 01955993.9, dated Jun. 6, 2005.
Examination Report in EP Application No. 03719774.6, dated Sep. 12, 2005.
Examination Report in EP Application No. 03719774.6, dated Apr. 12, 2006.
Examination Report in EP Application No. 01973431.8, dated Feb. 6, 2009.
International Search Report in Application No. PCT/US01/23651, dated Jun. 3, 2002.
International Search Report in Application No. PCT/US01/29787, dated Jun. 28, 2002.
International Preliminary Examination Report in Application No. PCT/US01/29787, dated Aug. 21, 2002.
International Preliminary Examination Report in Application No. PCT/US01/23651, dated Oct. 10, 2002.
International Search Report in Application No. PCT/US01/45198, dated Apr. 29, 2003.
International Search Report in Application No. PCT/US03/11707, dated Sep. 24, 2003.
International Search Report and Written Opinion in Application No. PCT/US03/11701, dated Oct. 13, 2004.
Written Opinion in Application No. PCT/US01/45198, dated May 31, 2007.
International Preliminary Examination Report in Application No. PCT/US01/45198, dated Apr. 2, 2008.
International Preliminary Report on Patentability in Application No. PCT/US2007/088858, dated Jul. 9, 2009.
Application and Response History in U.S. Appl. No. 09/627,201.
Application and Response History in U.S. Appl. No. 10/805,012.
Action and Response History in U.S. Appl. No. 09/667,737.
Application and Response History in U.S. Appl. No. 11/677,279.
Application and Response History in U.S. Appl. No. 09/716,717.

Action and Response History in U.S. Appl. No. 09/708,384.
Action and Response History in U.S. Appl. No. 10/123,960.
Action and Response History in U.S. Appl. No. 11/673,943.
Action and Response History in U.S. Appl. No. 10/028,126.
Summons to attend oral proceedings in corresponding European Application No. 01955993.9 dated Oct. 31, 2005.
Result of Consultation of Nov. 24, 2005 and Nov. 25, 2005 from corresponding European Application No. 01955993.
Submission in German dated Nov. 25, 2005 from corresponding European Application No. 01955993.9.
Annex to EPO Form 2004 with claims for grant in European Application No. 01955993.9.
Oral Proceeding Minutes with European Application No. 01955993.9.
Communication dated Apr. 26, 2005 in European Application No. 01955993.9.
Defense Information Systems Agency, Field Services Office, White Paper Report "pcAnywhere 10.5" (Sep. 2003).
Search Report in EP Application No. 02792391.1, dated Nov. 19, 2009.
International Search Report in Application No. PCT/US2002/040058, dated Nov. 3, 2003.
International Preliminary Examination Report in Application No. PCT/US2002/040058, dated Jun. 10, 2004.
Action and Response History in U.S. Appl. No. 10/784,138.
Action and Response History in U.S. Appl. No. 11/538,402.
Action and Response History in U.S. Appl. No. 13/329,928.
Examination Report in EP Application No. 01973431.8, dated Mar. 23, 2010.
Examination Report in EP Application No. 02792391.1, dated Mar. 10, 2010.
Response to Examination Report in EP Application No. 01973431.8, dated Oct. 4, 2010.
Letter from Foreign Associate regarding response filed in EP Application No. 01973431.8, dated Oct. 8, 2010.
English translation of Notification of Reasons for Refusal in Japanese Application No. 2002-529431, dated Nov. 8, 2010.
Notice of Reasons for Rejection in Japanese Application No. 2002-529431, dated Nov. 8, 2010.
Examination Report in EP Application No. 02792391.1, dated Feb. 27, 2012.
Machine Translation of Japanese Patent Publication No. 09-305407 (Pub Date Nov. 1997).
Machine Translation of Japanese Patent Publication No. 11-296453, (Pub Date Oct. 1999).
Machine Translation of Japanese Patent Publication No. 11-203079, (Pub Date Jul. 1999).
Machine Translation of Japanese Patent Publication No. 2000-309145, (Pub Date Nov. 2000).
Machine Translation of Japanese Patent Publication No. 2001-337817, (Pub Date Dec. 2001).
Machine Translation of Japanese Patent Publication No. 11-045195, (Pub Date Feb. 1999).
Machine Translation of Japanese Patent Publication No. 2000-163283, (Pub Date Jun. 2000).
Final Decision for Rejection in Japanese Patent Application No. 2002-515578, dated Jul. 10, 2012.
International Search Report &. Written Opinion in Application No. PCT/US2007/088858, dated May 21, 2008.
Summons to attend Oral Proceedings in counterpart EP Application No. 01973431.8, dated Feb. 2, 2011.
Second Auxiliary Response in EP Application No. 01973431.8, dated Apr. 26, 2011.
Oral Proceedings Communication in Application No. EP01973431.8, dated May 12, 2011.
Decision to Refuse in Application No. EP01973431.8, dated Jun. 21, 2011.
Action in Application No. JP 2002-515578, dated Jul. 26, 2011.
Response filed in Application No. JP2002-529431, dated May 2, 2011.
Action and Response History in U.S. Appl. No. 11/537,399.
Action and Response History in U.S. Appl. No. 11/677,279.
Action and Response History in U.S. Appl. No. 11/503,638.
Action and Response History in U.S. Appl. No. 11/673,943.
Action and Response History in U.S. Appl. No. 10/124,181.

* cited by examiner

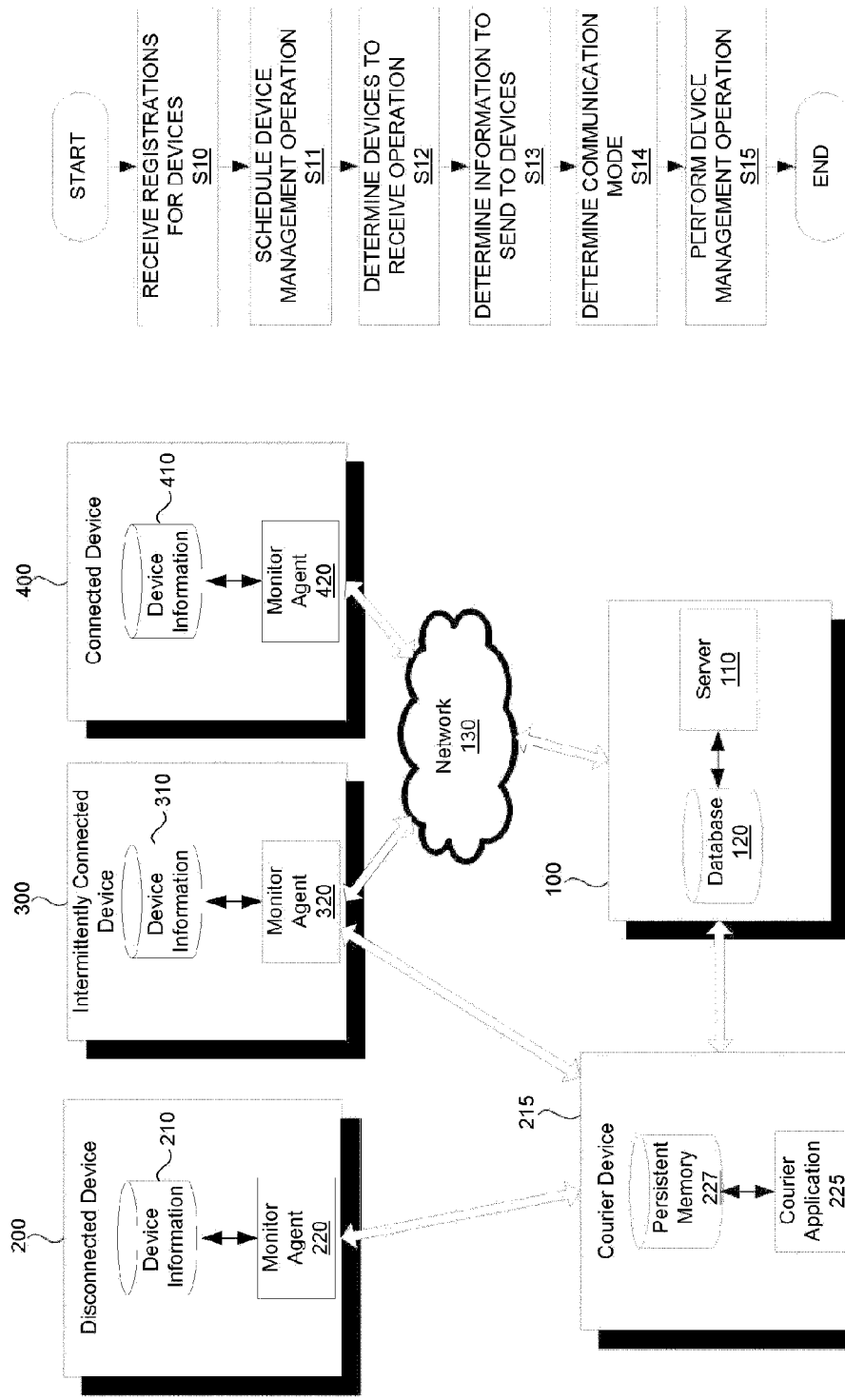

MANAGING DISTRIBUTED DEVICES WITH LIMITED CONNECTIVITY

CROSS-REFERENCE TO RELATED APPLICATIONS

Not Applicable.

BACKGROUND

1. Field of the Art

The present disclosure generally relates to managing distributed devices and to the management of distributed devices with limited contact-ability.

2. Background and Relevant Art

Remote management of equipment in the field has become a common practice for many Original Equipment Manufacturers (OEMs). The equipment is frequently distributed over a broad geographical region and often involves hundreds if not thousands or tens of thousands of individual devices. Remote management functions include but are not limited to monitoring and usage data collection, bi-directional file transfer, software update delivery, configuration management, etc. for the device or the monitor agent. These device management functions are most valuable when they contain and operate on accurate and current device data. Furthermore, one single system for providing these types of functions, regardless of device capability, is important to minimize the need for different business process and/or underlying application functions.

A centralized server system is often used to provide connectivity between the OEMs and the equipment. This connectivity allows the OEM to be much faster in resolving problems with the equipment, in part at least because a centralized server system allows the OEM to manage the devices remotely rather than at the site of each piece of equipment. Such an approach allows the OEMs to be more proactive in preventing problems or be more proactive in addressing problems before they become serious. Remote connectivity also enables OEMs to provide many new value added services, such as automatic consumables replenishment, or add completely new business models (e.g. usage based billing).

One very common hurdle that companies wishing to deploy remotely contactable devices face is the network infrastructure that is deployed at the customer site. Security measures such as firewalls and Internet proxies as well as common IT infrastructure mechanisms such as Network Address Translation (NAT) represent a barrier for direct connectivity to the equipment. In particular, to provide direct connections between all the equipment and the centralized server system would often be prohibitively expensive. As a result, many approaches have been proposed that involve use of the Internet or other global networks. One difficulty with such approaches is that security measures frequently block access to on-site devices by external systems. Solutions to these problems have also been proposed as described in patent application Ser. No. 10/028,126, Method and apparatus for managing intelligent assets in a distributed environment. These methods, however, require network connectivity from the device to the central server, often via the Internet or other public networks.

While such an approach may allow the system to communicate with devices that can communicate with the central server, it may be difficult or even impossible to communicate with devices which are not allowed or otherwise unable to communicate with the central server via a network. These solutions are further complicated by devices that may occasionally have network connectivity to the central server, but intermittently lose that connectivity for extended periods of time.

SUMMARY OF THE INVENTION

In one example, a method of managing distributed devices may include downloading information to a courier device from an enterprise. The information may be information for performing a device management operation. The method also includes communicating the information from the courier device to a monitor agent coupled to at least one of a disconnected device and an intermittently connected device.

In a system that communicates information between devices and an Enterprise, a method is provided for managing the devices. The method includes selecting devices coupled to at least one monitor agent to perform a device management operation; determining whether the selected monitor agents are disconnected or connected; performing the device management operation between the enterprise and the device if the monitor agent is connected over a network, and if the monitor agent is disconnected performing the device management operation on the device using an intermediate courier device.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments illustrated in the appended drawings. Understanding that these drawings depict only typical embodiments and are not, therefore, to be considered to be limiting in scope, embodiments will be described and explained with additional specificity and detail through the use of the accompanying drawings in which:

FIG. 1A illustrates a system managing configurations of distributed devices having varying degrees of connectivity according to one example;

FIG. 1B is a flowchart illustrating a method of performing device management operations on distributed devices according to one example;

DETAILED DESCRIPTION OF THE INVENTION

Figure 2A:
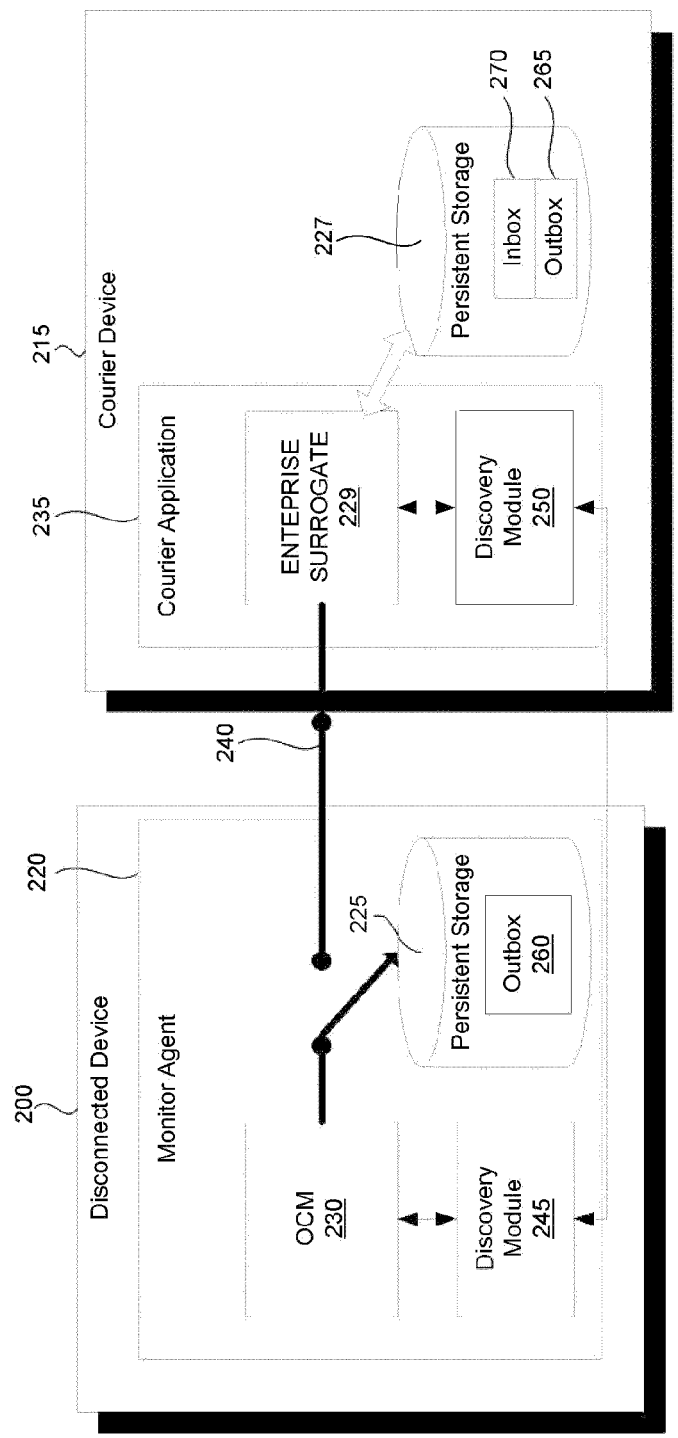
FIG. 2A is a flowchart illustrating one example for performing a device management operation on an intermittently connected device.

Systems, devices, and methods are described herein for performing device management operations on distributed devices. In at least one implementation, the device management operations are performed using one or more monitor agents that are coupled to the distributed devices. The system is able to perform the device management operation on the distributed devices regardless of whether the devices are able to access an Enterprise over a network. In one example, the distributed devices are coupled to at least one monitor agent, which may provide communication between the distributed device and an Enterprise system. A distributed device that is coupled to a monitor agent that is disconnected from the Enterprise, or a disconnected monitor agent, may be referred to as a disconnected device. Similarly, a distributed device that is coupled to a monitor agent that is connected the Enterprise may be referred to as a connected device. Further, a distributed device that is coupled to a monitor agent that is intermittently connected to the Enterprise may be referred to as an intermittently connected device. These distributed devices may be thus described regardless of whether the monitor agent resides within the distributed device or is otherwise communicatively coupled to the distributed device. It will be understood that the communication between external devices, such as the Enterprise system or courier devices as described below will be performed on each distributed device using a monitor agent. The system may make use of an intermediate courier device to perform the device management operation on disconnected devices. The courier device receives all the information necessary to perform the device management operation from the enterprise. The courier device then accesses the disconnected monitor agent to perform the device management operation on the associated device.

The system audits the communication between the Enterprise and connected devices, as well as the communication between a courier device and the Enterprise and the courier device disconnected device.

The system may also perform device management operations on devices which are only intermittently connected. In this scenario, the intermediate Courier is not required, but Courier-like functionality is required on the device and support for such connectivity modes is required on the enterprise server. For example, a monitor agent that determines a connection is present can simply communicate with the enterprise server as a connected device. If and when the connection to the enterprise is not possible, the monitor agent can detect this and change communication modes from "connected" to "disconnected" where data is stored in persistent storage rather than communicated over the network. When the connection is once again possible, the monitor agent can detect this and upload all stored device information for processing directly to the enterprise server and change back to a connected communication mode. The enterprise also needs to be aware of the intermittent loss of connectivity so it can detect and handle error conditions correctly. For example, a timeout for processing a device bound message would be different for an intermittently connected monitor agent versus a connected monitor agent. Intermittently connected monitor agents may also work with the Courier in the same fashion as disconnected monitor agents. When the Courier is servicing intermittently connected monitor agents, safe guards may be in place to preserve the order of order-dependent remote management operations.

As shown in FIG. 1A, the system can include an Enterprise 100 with a database 120 and a server 110 that communicates with at least one device that may include a disconnected device 200 as well as an intermittently connected device 300 and a connected device 400. The devices 200, 300, 400 are shown as separate and distinct devices for ease of reference. Each of the devices 200, 300, 400 is configured to communicate device information 210, 310, 410 to an external device or system to allow the Enterprise 100 to perform device management operations. In particular, a courier device 215 may be used to deliver device management information from the disconnected device 200 and to retrieve the device information 210.

A disconnected device 200 may include a device operating in a location in which network connectivity is not desired and/or not possible. An example may include a device located in a hospital setting where only local network traffic is allowed. Another example is a device that simply does not connect to a local or global network, such as a roof top air handling unit. A further example may be a device, such as a medical device, in which network connectivity for the device is not desired in the device's typical operating environment, such as in an operating room or an emergency room in which the network connectivity may interfere with the device operation. Intermittently connected devices may be devices that are moved from one location to another where the network availability may change.

Additionally, varying degrees of connectivity may be found within the same device depending on the circumstances. For example, portable equipment whose wired connection may be disconnected for portability or wirelessly networked equipment that may be operated out of range of the wireless network. The devices may include, without limitation, a power meter, MRI machine, printing press, X-Ray machine, or other devices that include, or can be adapted to include, a monitor agent. These devices may vary in complexity and may have a set of subsystems associated with them.

Each device is coupled to a monitor agent 220, 320, and 420 respectively. Alternatively (not shown in the figure) a single monitor agent may be coupled to a plurality of devices. The monitor agents 220, 320, 420 may be contained within a corresponding device or may be connected to the device by way of a serial port, USB, firewire, Ethernet, or the like. Each monitor agent 220, 320, 420 is configured to monitor the device status, usage, software configuration, etc. and verify that the device is properly functioning and maintained. Each monitor agent 220, 320, 420 collects device information 210, 310, 410 which includes, but is not limited to basic device profile information, device serial number, unique identifiers, data readings, installed components, and software versions. The device information may be collected for several reasons, including but not limited to, enterprise user requests, monitored conditions as met by defined rules, monitor agent restarts, software updates applied, etc. This information ultimately is sent back to the Enterprise server 110. The method for communicating the information varies depending on the connectivity mode of the monitor agent. For connected monitor agents, this information is communicated to the Enterprise server 110 directly.

Disconnected monitor agents 220 store this information in persistent storage and communicate the information to a courier device 310 when the courier device 310 is on site, and the courier device 310 subsequently uploads it to the Enterprise server 110. An intermittently-connected monitor agent 320 sends the information directly to the Enterprise server 110 when it has network connectivity to the Enterprise server 110 and stores this information locally in persistent storage when it does not have network connectivity to the Enterprise 100. The intermittently-connected monitor agent 320 uploads stored information when connectivity is restored. In addition, the intermittently-connected monitor agent 320 may communicate with the courier device 215 to upload stored device information.

In particular, the device information 410 may be sent directly from the connected monitor agent 420 to the Enterprise 100 over a network 130 based on established conditions and/or rules, which may include, without limitation monitoring data, device usage data, software configuration information and the like. This information may be sent, without limitation based on user requests, scheduled tasks, device activity, software updates, requests received by external control or systems, and/or rule evaluation.

If the ability of the enterprise 100 to reach a monitor agent over a network 130 is limited, such as with the disconnected monitor agent 220 or with the intermittently connected monitor agent 320, the disconnected monitor agent 220 and the intermittently connected monitor agent 320 may be configured to store the information for transmission at a later point. The intermittently connected monitor agent 320 can upload the stored information when network connectivity is restored. The disconnected monitor agent 220 may communicate the stored device information 210 to a courier device 210 when the courier device 210 is on site, as will be discussed in more detail below. In particular, the disconnected monitor agent 220 may communicate with the courier device 215 when the courier device 215 is on site and discovered by the courier device 215.

The intermittently connected monitor agent 320 may also transmit the device information 310 in a similar manner as occurs in the connected scenario when connectivity over network 130 is available, or store the information when the network connectivity over network 130 is not available. The intermittently connected monitor agent 320 may be configured to send the stored device information 320 over the network 130 when network connectivity becomes available and/or to send the stored device information 320 to a courier device 215. For ease of reference, the intermittently connected monitor agent 320 is illustrated communicating over the network 130.

Each monitor agent 220, 320, 420 collects the device information 210, 310, 410 from the sources of device data, such as a database, a registry, the file system, or data collection protocols. The device information 210, 310, 410 may include various classes of information including: monitoring data, usage data, and configuration data, operational status, operational data, usage information, location information, environmental information, SW/HW version information (i.e., "configuration" information), or any data available on the device. To collect the device information 210, 310, 410 the monitor agents 220, 320, 420 may use plug-in modules using either standard or device-proprietary methods.

The manner in which the Enterprise 100 communicates with the devices 200, 300, 400 by way of the monitor agent 220, 320, 420 may be selected according to the connectivity of the monitor agent. In particular, the Enterprise 100 may communicate with the intermittently connected monitor agent 320 and the connected monitor agent 420 over the network 130, such as the global network, the Internet, a wide area network or other network. The Enterprise 100 may communicate with the disconnected monitor agent 220 using a courier device 215. The courier device 215 has a courier application 225 residing thereon that allows the courier device 215 to interactively communicate with the disconnected monitor agent 220 to perform device management operations previously requested on the Enterprise 100. Device management operations may include, without limitation, delivering software updates and other communications from the Enterprise 100 and receiving requests, receipts, and other information for delivery to the Enterprise 100. The device management operations may be performed on the end devices 200, 300, 400 and/or on the monitor agents 220, 320, 420. One exemplary implementation of a courier application will be described in more detail with reference to FIGS. 2A-2B.

Continuing with reference to FIG. 1A, the Enterprise 100 is also configured to communicate with a monitor agent 320 that is intermittently connected to the network 130. The monitor agent 320 associated with the intermittently connected device 300 may be configured to determine whether a connection to the Enterprise 100 via the network 130 is available. If a network connection is available, the monitor agent 320 may communicate with the Enterprise 100 over the network 130. If a network connection is not available, the monitor agent 320 may be configured to store the information in non-volatile memory until it desirable to transmit the information, such as when a network connection is reestablished.

Still referring to FIG. 1A, the Enterprise 100 is also configured to communicate with a connected device 400 by way of monitor agent 420. In particular, the Enterprise 100 may communicate with the monitor agent 420 through the network 130. Accordingly, the Enterprise 100 is able to communicate with various types of devices over the network 130 or by using a courier device 215.

The Enterprise 100 is able to perform device management operations on each of the devices using these types of communication. Accordingly, the monitor agent may be configured to communicate with all of the devices, regardless of ability of the enterprise 100 to contact the devices 200, 300, 400 over the network 130. As introduced, examples will be provided in which the monitor agents allow communication between devices and the Enterprise 100, beginning with a disconnected device.

FIG. 1B is a flowchart of one exemplary method for managing remote devices. The method begins in step S10 by receiving registrations from devices. Step S10 can occur immediately before or much earlier than any subsequent step, for example, days, weeks, months, or even years later. A technician can build the defined configuration based on the hardware and software specification for the device. The devices which are connected or intermittently connected 400, 300 to the Enterprise 100 over the network 130 may send the registrations over the network 130. Disconnected devices may be register with the Enterprise 100 in a different manner, such as through the use of the courier device 215, by the devices manufacturer, or manually by a user accessing the Enterprise over a network.

Accordingly, at step S11 the method continues when a device management operation is scheduled. Scheduling a device management operation may include selecting a device or group of devices. Selecting a device or group of device may be accomplished by selecting the device or group of device themselves or by selecting a device or group of devices with one or more desired characteristics. For example, scheduling a device management operation may include scheduling a device management operation for a group of medical devices with similar characteristics, such as devices of a certain type made by a given manufacturer.

Further, if a user schedules the device operation management, the user may do so without a knowledge of which devices are connected or disconnected at a given time. In particular, the Enterprise 100 is configured to perform the device management operation on the intermittently connected device 300 and the connected device 400 using the network 130 and to perform the device management operation on the disconnected device 200 using the courier device 215. The selection may be performed automatically, as will be discussed in more detail below.

At step S12, the Enterprise 100 determines which devices should receive the software distribution. In one example, the Enterprise 100 analyzes the configuration of each of the devices to determine whether a given device is eligible to receive the device management operation. If a device is eligible for the device management operation, at S13 the Enterprise 100 determines which information should be sent to and/or received from the device.

At S14, the Enterprise 100 then determines a communication mode for performing the device management operation. The communication mode the Enterprise 100 uses may depend, at least in part, on the connectivity of the target monitor agent. In particular, the Enterprise 100 may contact devices over the network 130, such as the intermittently connected device 300 and the connected device 400. The Enterprise 100 is also able to manage disconnected devices 200 through the use of a courier device 215 and/or a courier application. Accordingly, the Enterprise selects between communication with a device over a network and communication using the courier device 215 as an intermediary between the disconnected device 200 and the Enterprise 100. Once the Enterprise has determined how to communicate with each device, at S15 the device management operation is performed on each device.

FIG. 2A is a schematic diagram of a disconnected device 200 with a monitor agent 220 that is in communication with a courier application 225. The courier application 225 is shown as residing on a courier device 215. The courier application 225 communicates with the monitor agent 220 to perform device management operations, which include, without limitation, determining the configuration of the disconnected device 200, transmitting appropriate software updates stored on the courier device, and receiving monitoring or usage data from the monitor agent 220 for communication to the Enterprise 100.

In one example, the courier device 215 may be a portable device that may be moved to the physical location of a disconnected device. In another example, the courier device 215 may be a stationary device to which the disconnected device is docked.

In either case, the courier device 215 may have persistent storage 227 in communication with the courier application 225. The persistent storage 227 is configured to store the instructions for the device management operations and all other data that is required to perform the operations. The device persistent storage 227 may also store information that is generated during the execution of the device management operations, which the monitor agent 220 communicates to the courier application 225. The device persistent storage 227 may also store information previously stored by disconnected device 200 on persistent storage 235 that was collected or generated while disconnected device 200 was not connected to the courier application 225. The information from the monitor agent 220 may then be uploaded to an Enterprise 100 at a later point. In the present example, the courier application 225 includes a courier enterprise surrogate 229 residing thereon that is configured to control the interaction between the monitor agent 220 and external connections. The courier enterprise surrogate 229 allows the courier device 215 to be configured to access the Enterprise 100 (FIG. 1A) in a number of ways. In particular, the courier device 215 may be configured to access a global or other network in order to access the Enterprise (100).

The monitor agent 220 also includes a monitor agent OCM 230. The monitor agent OCM 230 allows the monitor agent 220 to communicate with various types of networks and devices. In particular, the monitor agent OCM 230 may be configured to determine the appropriate protocol for sending outgoing communication and for subsequently ensuring the communication is in the appropriate protocol. The monitor agent OCM 230 may also be configured to interact with the courier device 215 as well as to allow for any number of failed attempt retries as desired. In the present example, the monitor agent OCM 230 is shown in communication with the courier enterprise surrogate 229. The monitor agent OCM 230 can also recognize if there is no connection and store the information on the disk.

Each of the devices 200, 300, 400 illustrated in FIG. 1A may include a monitor agent having an OCM. The principles of the monitor agent OCM 230 discussed generally below may be applied to the other monitor agents as well. The monitor agent OCM 230 is switchably coupled to a persistent storage 235 and to an external line 240. In the illustrated example, the persistent storage 235 and the monitor agent 230 both reside on the disconnected device 200. In other examples, the monitor agent 230 and persistent storage 235 may on a separate device communicatively coupled to the disconnected device 200. Methods for such communicative coupling may include, but are not limited to, serial, USB, Ethernet, and other communicative means. The OCM 230 will direct communications to be output and/or information to be conveyed to the monitor agent to the persistent storage 235 or the external connection 240 according to the external connections available to the monitor agent. The determination of which external connections may be made by the OCM 230 based on network access to the Enterprise as determined by the OCM or the availability of courier devices as determined by discovery module 245.

In particular, if an external connection is available, the monitor agent OCM 230 may be configured to route the communication over the external line. Similarly, if no external connection is available, the monitor agent OCM 230 may be configured to route the communication to the persistent storage 235. Information routed to the persistent storage 235 may be stored there until such time as an external connection becomes available. At that point the monitor agent OCM 230 may cause the information stored on the persistent storage 235 to be routed over the external connection 240. The monitor agent OCM 230 is coupled to a device discovery module 245. The device discovery module 245 interacts with external devices that may attempt to access the monitor agent 220.

The discussion will now turn to the specific example of the monitor agent OCM 230 operating in the disconnected device 215. The courier application 225 includes a courier discovery module 250 that communicates with the device discovery module 245 to establish communication between the monitor agent 220 and the courier application 225 as previously discussed. Once communication has been established, the monitor agent OCM 230 communicates with the courier application 225 through external connection 240 and to the courier enterprise surrogate 229 in particular.

The persistent storage 235 associated with the monitor agent 220 is shown as including a device inbox 255 as well as a device outbox 260. The device inbox 255 is configured to receive messages, updates, or other information transmitted from an external source to the monitor agent 220. In the present example OCM 230 is configured to receive information from a courier inbox 270 In a similar fashion, the device outbox 260 is configured to send information to a courier outbox 265.

Several types of information may be stored in the device outbox 260 and/or sent to the courier outbox 270. This information may be related to events within the device. Some events may include installation of new software. The information stored in the device outbox 260 may be retained until confirmation is received that the information has been successfully received by the Enterprise 100 (FIG. 1A).

All of the information communicated between the monitor agent 220 and the courier application 225 is audited such that a record or receipt of the data exchanged is maintained on the monitor agent 220, the courier device 215, or both. Once the communication between the monitor agent 220 and the courier application 225 is complete, the courier device 215 may be disconnected from the monitor agent 220.

The courier device 215 may be used to perform any number of device management operations on any number of devices, including disconnected devices. After the device management operations are completed, the courier device 215 may be connected to the Enterprise 100 (FIG. 1A). Once the courier device 215 is coupled to the Enterprise 100, the information uploaded from the monitor agent 220 to the courier outbox 270 is then transferred from the courier outbox 265 to the Enterprise 100.

A receipt of the communication is stored in the courier inbox 270, in the Enterprise 100, or both. While the courier device 215 is coupled to the Enterprise 100, the courier device 215 may download additional packages to perform additional device management operations on disconnected devices, if such packages are available. As previously discussed, in order to perform device management operations on the disconnected devices, the courier device is connected to a monitor agent.

When the courier device 215 is coupled to the monitor agent 220, the record of the Enterprise's receipt of the information previously uploaded to the courier device is communicated to the monitor agent. Receiving the receipt that the previously conveyed information has been received by the Enterprise, the previously transmitted information may be deleted from the monitor agent 220, as there is a record that the information has been received.

Figure 2B:
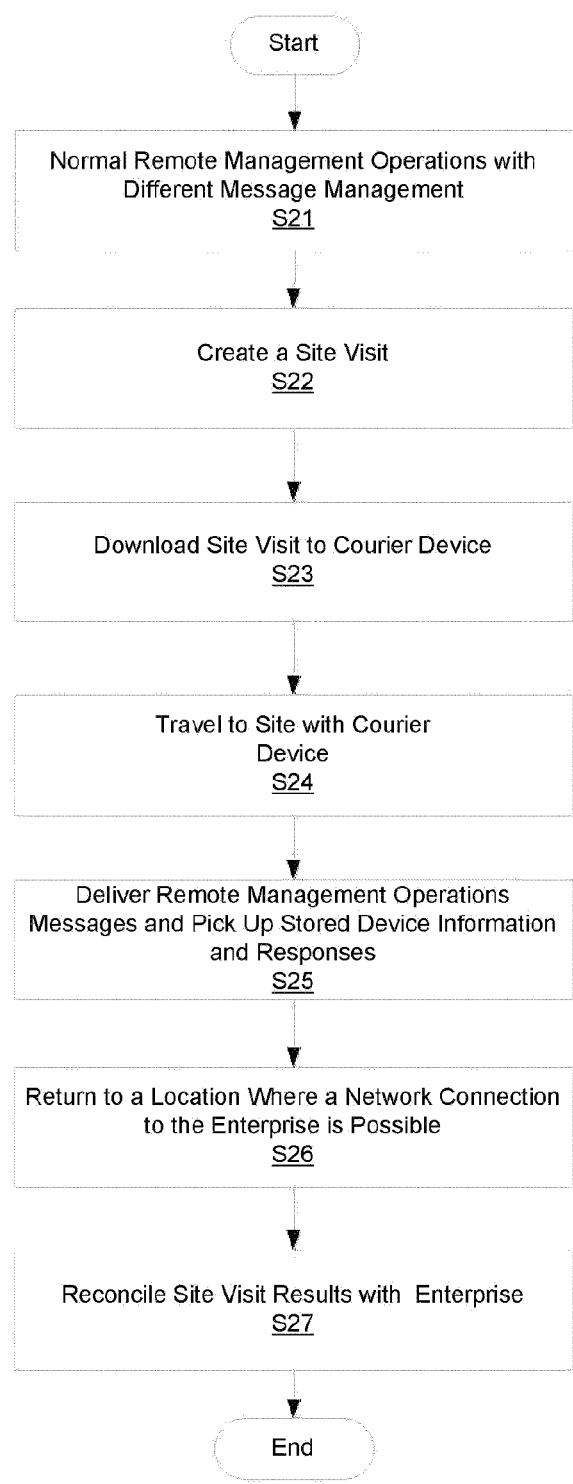
FIG. 2B is a flowchart illustrating a method of performing a device management operation on a disconnected device according to one example.

FIG. 2B is a flowchart of one exemplary method for performing a device management operation on disconnected devices. By way of introduction, the method illustrated in FIG. 2 may include the steps of performing remote management operations with different message management at step S20, creating a site visit at step S21, downloading a site visit to a courier at step S22, traveling to a site with the courier at step S23, delivering remote management operations messages and picking up stored device information and responses at step S24, returning to a location where a network connection to the enterprise is possible at step S25, and reconciling site visit results with the Enterprise at step S26. Each of these steps will now be discussed in more detail below.

As introduced, the method begins at step S20 by performing remote management operations with different message management. The messages may contain anything, but may specifically contain remote management operation requests such as software updates, data collection requests, configuration management data collection requests, file transfer requests, etc. In one example, users of the Enterprise may request remote management operations on disconnected devices in a similar manner as they do for requesting remote management operations on connected devices. Internally, the Enterprise server manages these messages slightly differently.

For example, in the case of performing device management operations on connected monitor agents, the messages may stay in the message queue indefinitely or the messages may have some delivery timeout associated with them. In the case where the message is for a disconnected monitor agent, the timeout (if present) will be consistent with the expected frequency of a site visit for the given monitor agent, or an arbitrary value. Timeout value for a disconnected monitor agent may generally be larger than for a connected monitor agent.

Once the message management operation has been performed, the method continues at step S21 when a site visit is created. In one example, the site visit may be created on the Enterprise system. The site visit as used herein is a construct that represents the intention to make a site visit to deliver the messages. The site visit may have information such as the assigned field service technician, delivery date, name, description, the user who created it, a state, etc. The state of the site visit may initially be that site visit is ready for download. Such a state may indicate that the site visit has been created and the site visit and/or the messages associated with the site visit are ready to be downloaded to a courier. Other states of the site visit may include that the site visit has been downloaded, activated, reconciled, or cancelled. If the site visit has been downloaded, the site visit and all associated device information are downloaded to a courier device. An activated state indicates the site visit has been activated at least once on site to deliver messages and content. This state may be entered multiple times to deal with sites with a large number of monitor agents. A reconciled state occurs when the results from the site visit have been reconciled with the Enterprise. A cancelled state occurs when a user has decided to cancel the site visit for some reason. One specific example of method for creating a site visit will be discussed in more detail with reference to FIG. 3.

Figure 3:
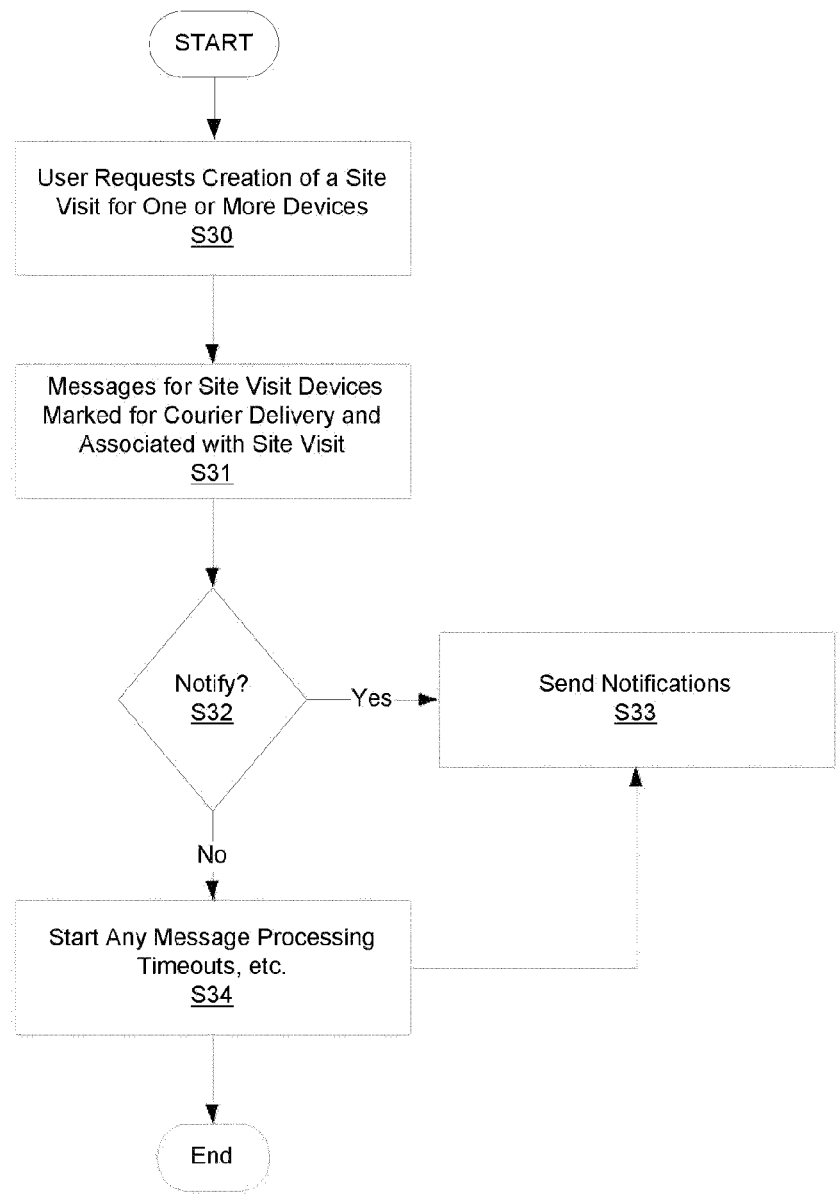
FIG. 3 is a flowchart illustrating one example of creating a site visit on an Enterprise server.

FIG. 3 is a flowchart illustrating one example of creating a site visit on an Enterprise server. The method begins at step S30 when the user requests the site visit to be made for one monitor agent or a group of monitor agents at a site. The user may specify many of the parameters for the site visit. These parameters may include specifying the field technician that will deliver the site visit, the expected delivery date, etc.

The method continues at step S31 when messages that have been created for the disconnected monitor agents that are in the list from S10 are then associated with the site visit. The state of the messages are appropriately updated to indicate they are "in flight" to the monitor agents. Next, at step S32 the Enterprise system determines whether to send out notifications to the users. For example, the Enterprise system may be configured to send out notifications to users. Users may include the field service technicians to which the site visit is assigned. The Enterprise system may also send out notifications to other users or Enterprise systems for business process integration.

Continuing at step S33, the Enterprise system then send any notifications to users and external systems that should be updated about the creation of the site visit. Notifications may also be sent on other updates to the site visit, including reassignment to another field server technician, changes to the expected delivery date, and state changes (such as cancellation).

Finally, at step S34 the Enterprise system initiates any message-management functions, such as setting timeouts, etc. Accordingly, the Enterprise system may be configured to create a site visit and notify users of the site visit. The flowchart illustrated in FIG. 3 is only one exemplary process for step S21 illustrated in FIG. 2.

Turning now to FIG. 2, once the site visit has been created, the site visit is downloaded to a courier device at step S22. Downloading the site visit to the courier device may be initiated by the courier device. In one example, an intermediate software application and portable computer may be used to transfer messages between the Enterprise server and disconnected monitor agents.

The user of the courier device requests to list the site visits that are assigned from them. From the list, the user may choose to download one or more site visits. The download process may include downloading the messages that are to be delivered to the disconnected monitor agents associated with the site visit. In addition to the remote management operation messages, the content to fulfill the messages may also be downloaded. This content may include, but is not limited to, device profile information, software packages, files to transfer, etc. The messages and content may be stored locally on the courier device's persistent storage. The messages and content may be compressed on the Enterprise and decompressed at the Courier after download or just before it is needed to save download time, bandwidth, and storage space on the Courier.

Some of the content may be shared across site visits. Examples include software packages or other files to transfer that could be large. This may be beneficial because it may reduce or minimize site visit download time and storage consumed on the courier device.

Next, a user, such as the field service technician, takes the courier device with the downloaded site visits to the various sites at step S23. In the case where a permanent courier device is resident at the site, this step may be omitted.

With courier device at the site of the disconnected monitor agent, at step S24 the courier device delivers remote management operations messages and picks up stored content and responses. For example, once on site, the field service technician may use the courier device to locate and deliver the remote management operation messages and the associated content. In addition to delivering Enterprise-to-monitor agent operation requests, the courier device also collects the information that the disconnected monitor agents may have stored to the persistent storage associated with the disconnected monitor agent as well as the information that may result from the delivery of the remote management operations. All of the information collected from the disconnected monitor agents may be stored on the courier device's persistent storage for later upload to the Enterprise server. One specific example of step S24 delivering messages and picking up stored content and responses is illustrated in more detail in FIG. 4.

Figure 4:
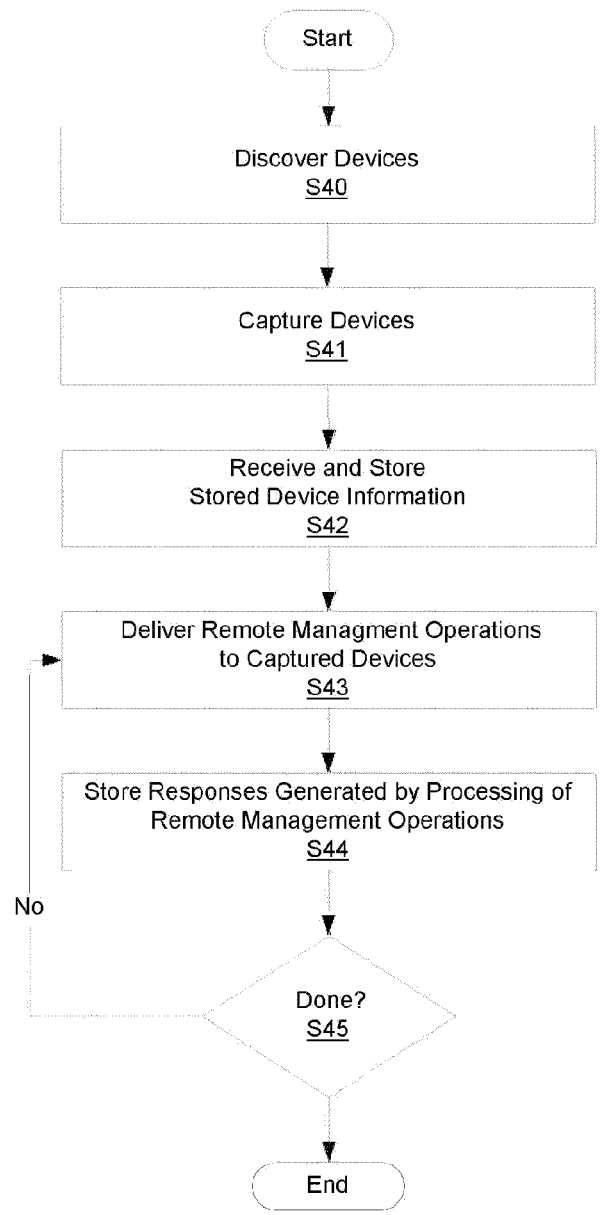
FIG. 4 is a flowchart illustrating a method of delivering messages and picking up stored device information and responses according to one example.

FIG. 4 is a flowchart illustrating a method of delivering messages and picking up stored content and responses according to one example. The method begins at step S40 when the courier device discovers the disconnected monitor agents. Since the field technician may not know how to communicate with the monitor agents on the site, it may be desirable to have a way to "find" the monitor agents that are disconnected from the Enterprise server and publish the local address of the courier application running on the courier device.

To accomplish this, any means of discovering monitor agents is applicable. For example, a specific discovery message could be sent to all monitor agents that are listening to a predefined multi-cast group or broadcast address. Well-defined discovery protocols may also be used, such as the Service Location Protocol (SLP). Numerous other protocols are available for achieving the discovery of monitor agents.

Once found, filtering techniques may be used to avoid discovering monitor agents that are not under management by the field service technician or the organization represented by the field server technician. The monitor agents that are discovered may also be authenticated against the profile information downloaded as part of the site visit download step.

The list of monitor agents that are discovered (and authenticated) may be displayed to a user. The user may choose to deliver and pick up content to one or more of the monitor agents.

Once the field technician chooses to communicate to the discovered monitor agents, the monitor agents are notified to thereby "capture" the disconnected monitor agents at step S41. Once notified that the monitor agent should be captured, the process may include redirecting all communications to the Courier and receiving and storing stored device content at step S42. In one example, the disconnected monitor agents may take upload previously stored content to the Courier. This operation could optionally include bundling messages into a single entity, compressing the content, etc. for the sake of efficiency. The disconnected monitor agents may also mark the uploaded messages or message bundles as "waiting for receipt". Further, the disconnected monitor agents may redirect communications from the local persistent storage to the courier application. At this point, the Courier may be serving as a surrogate for the Enterprise server.

At step S43, the method continues by delivering device management operations to the disconnected monitor agents that have been captured. The disconnected monitor agents may have several modes of operation. The monitor agents may "pull" messages using a polling paradigm or may be "contactable" and allow the messages to be pushed to the monitor agents. If using the polling scenario, the capture can be used to trigger high frequency polling to minimize the polling latency and hence time spent on site. In either model, the messages that are stored on the Courier are delivered to the now Courier-connected monitor agents.

At step S44, many remote management operations may require that the monitor agent send back some type of information to the Enterprise. For example, a software update request operation may require that the monitor agent send back status updates to track the progress of the installation (downloaded, installed, activated, etc.). Since the Courier is the surrogate for the Enterprise server, these notification messages are sent to the Courier and stored in the Courier persistent storage. In addition, device information as described above may also be stored in the Courier persistent storage. In one example, information sent to the Courier may be compressed on the monitor agent and then later decompressed on the Courier.

Steps S43 and S44 may repeat until the Courier-connected monitor agent completes all remote management operations. Once complete, the connection to the Courier is released and the monitor agents return to their disconnected mode of operation, storing Enterprise-bound messages on their local persistent storage. Thus, step S45 includes determining if the delivery and pickup step is complete and repeating steps S43 and S44 until the delivery and pickup step is complete. Accordingly, FIG. 4 is one example of performing step S25 of FIG. 2.

Once the step of delivering the remote management operations messages and picking up stored content and responses is complete at step S25, at step S26 the courier device is returned to a location where a network connection the Enterprise is possible. In the case where a permanent Courier is resident at the site, this step may be omitted.

Finally, at step S27 results of the site visit, which includes, but is not limited to, the information about the delivery of messages to the monitor agents and all collected information, is communicated to the Enterprise. This closes the loop on the communications between Enterprise and monitor agent. All of the information from the site visit may be communicated back to the Enterprise.

Figure 5:
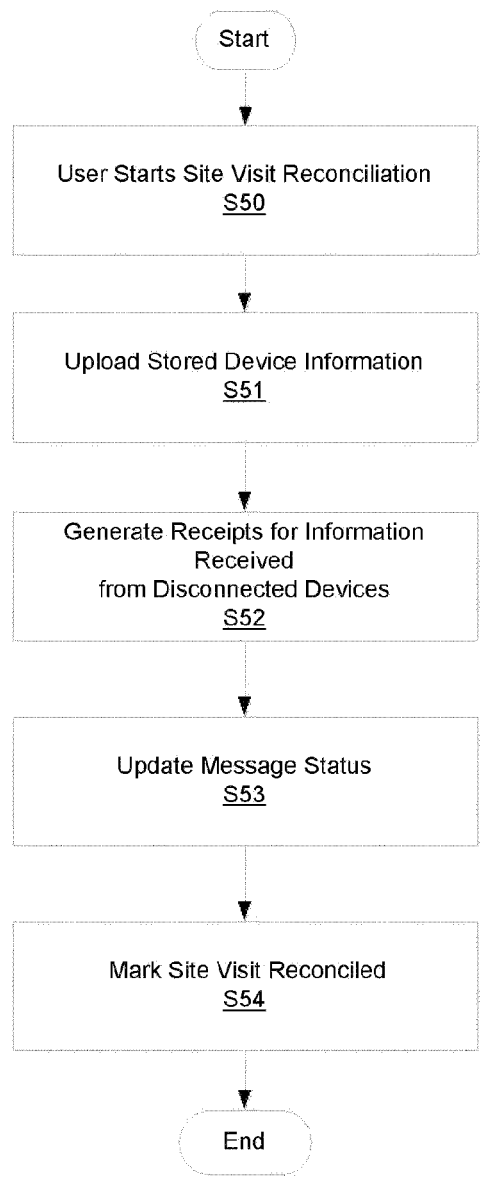
FIG. 5 is a flowchart illustrating a process for reconciling site visit results.

FIG. 5 is a flowchart illustrating a process for reconciling site visit results with the Enterprise. To close the loop on the communications between the Enterprise and monitor agents, the information collected from the disconnected monitor agents as well as the site visit state information (such as the message delivery status) may be sent to the Enterprise. The process may be initiated from the courier device user when there is connectivity to the Enterprise application. Accordingly, the process begins at step S50 when a user of the courier device initiates the reconciliation of information for one or more site visit operations.

At step S51, the courier device uploads the content collected from the monitor agents to the Enterprise server. This information includes the messages or message bundles collected from the disconnected monitor agents as well as the information that was produced as a result of the delivery of the remote management operations.

Next at step S52, when the Enterprise receives information that was collected from a disconnected monitor agent, the Enterprise may generate a receipt for the monitor agent so that it may cleanup the stored information. This receipt may simply be a remote management request that will be delivered on the next site visit. The monitor agent may also have an age-based mechanism to cleanup the messages or message bundles even if a receipt is not received.

Thereafter, at step S53 the state of the site visit is also sent to the Enterprise. The state includes the on site actions taken by the Courier user, such as activation of the site visit. The state also includes information such as status of message deliveries to maintain the message management processing on the Enterprise.

Finally, at step S54 it may be desirable for the courier device to mark the site visit as reconciled after successfully uploading and reporting state to the Enterprise server. The Enterprise may in turn use this final closure notice on the site visit to do any remaining cleanup, notifications (to users and/or external Enterprises) and processing on the site visit.

The management of a disconnected monitor agent has been described with the use of a monitor agent in communication with a courier application running on a courier device. As previously introduced, other device types may be managed using monitor agents. In one example, the monitor agents 320 and 420 illustrated in FIG. 1A are substantially similar to the monitor agent 220 described above.

The monitor agent 320 includes an outgoing communication module (OCM) 330. The OCM 330 is configured to determine whether a connection is available to the Enterprise 100 (FIG. 1A) and to manage communication of the monitor agent 320 with the Enterprise. If a connection to the Enterprise 100 is not available, the OCM 330 stores the information in persistent storage 335. If the OCM 330 determines that a connection is available and that communication with the Enterprise 100 is appropriate, the OCM 330 may communicate with the Enterprise 100 to perform device management operations. In addition to performing device management operations, the OCM 330 may also directly upload (just like the courier does) the data that was stored while the monitor agent was disconnected. By uploading the data directly, the receipt also comes back directly to the monitor agent so cleanup may be performed.

Figure 6:
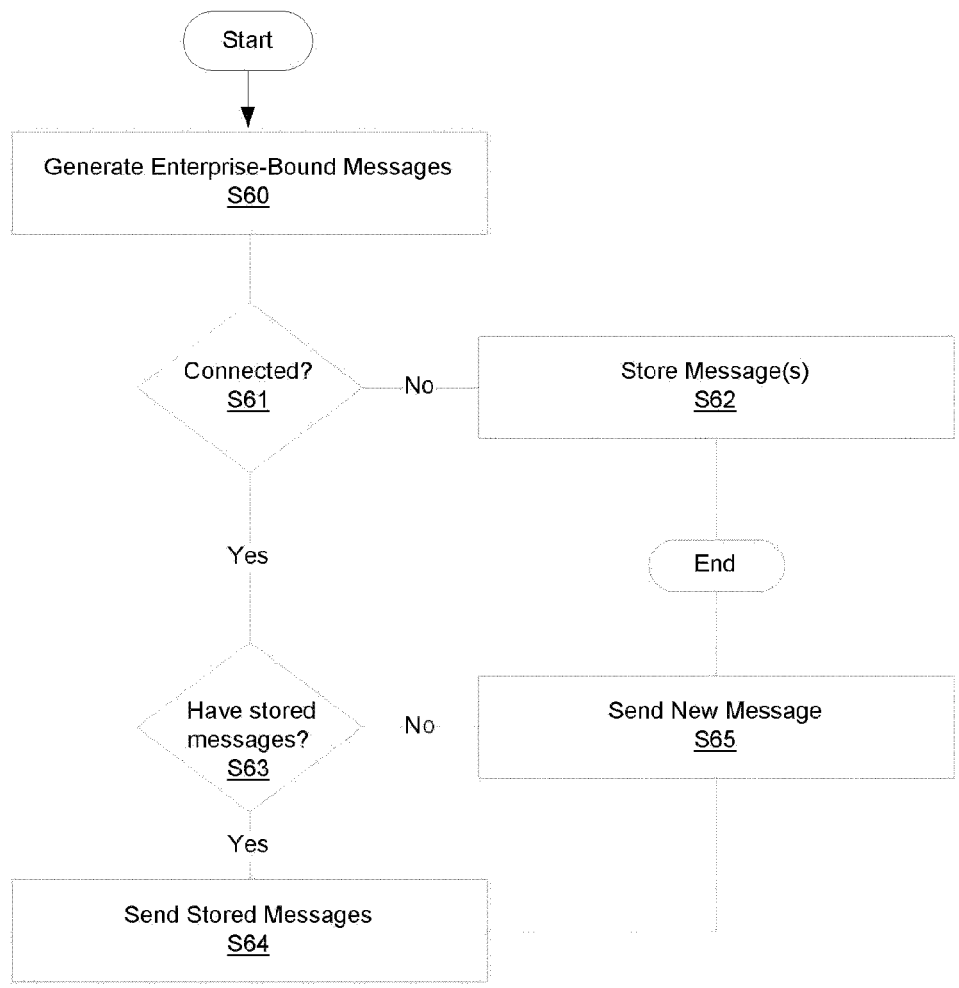
FIG. 6 is a schematic diagram of a courier device coupled to a disconnected device for performing a device management operation according to one example.

FIG. 6 is a flowchart illustrating a method of delivering messages and retrieving content and responses from an intermittently connected monitor agent. In one example, a monitor agent can also contain selected capabilities of the courier device to efficiently transition between connected mode and disconnected mode.

The Enterprise may treat intermittently connected monitor agents the same as or similar to a disconnected monitor agent with respect to the message management. For example, the Enterprise may use timeout values based on the expected frequency of the monitor agent being connected, or some arbitrary timeout value.

The process begins at step S60 with normal monitor agent processing, In particular, Enterprise-bound information may be generated in response to local monitoring, user input, or other device events. Examples of such information include submitting a notification of a fault condition or high frequency data readings around an event.

Next, at step S71 the monitor agent can detect if it has a connection and behave differently based on the status of the connection. Several methods can be used to determine if the connection is present, such as a "ping" (ICMP) to the Enterprise destination, a simple network connection to the Enterprise endpoint, or a full-blown service invocation (using Web Services, for example).

If the determination at step S61 is that the connection is not available, the outbound message is stored on the local persistent storage for processing later at step S62. If the determination at step S61 is that there is a connection, the monitor agent checks if stored outbound messages are present at step S63.

If the determination at step S63 is that there are stored outbound messages, the stored outbound messages are uploaded to the Enterprise at step S64. The stored outbound messages may be uploaded in a similar manner as when the monitor agent is connected to the courier device after which new messages are also sent to the courier device at step S65. If no messages are stored, new messages are sent directly to the courier at step S65. The courier device then uploads the content to the Enterprise as described above. This provides the information to the Enterprise that was generated while the monitor agent was disconnected.

The Enterprise processes the messages the same as if the Courier application had uploaded the messages, including generating receipts for the uploaded content. The monitor agent responds to the receipt in the same way the disconnected monitor agent does.

Finally, as in the simple connected mode case, the message that was generated and initiated the whole process is sent directly to the Enterprise. In another example, once the connection has gone away the message can simply be stored as in step S62.

The communication between the enterprise 100 and the monitor agent 320 can be rejected due to firewalls, NAT, etc., that are implemented to block unwanted communication. The system can use a "polling server" model to enhance the ability to communicate between the monitor agent and the enterprise if needed. The "polling server" model is discussed, for example, in U.S. Patent Publication No. 2003/0118353 entitled Method and Apparatus for Managing Intelligent Assets in a Distributed Environment, which is incorporated by referencing its entirety. Any other polling strategy may also be used.

The present invention may be embodied in other specific forms without departing from its spirit or essential characteristics. The described embodiments are to be considered in all respects only an illustrative and not restrictive. The scope of the invention is, therefore, indicated by the appended claims rather than by the foregoing description. All changes that come within the meaning and range of equivalency of the claims are to be embraced within their scope.

What is claimed is:

1. A method performed by a courier device configured to communicate with one or more devices, the courier device storing first information relating to a target device among the one or more devices, the first information being received from an enterprise system, the method comprising:
    discovering a monitor agent that is associated with the target device and that is disconnected from the enterprise system, the monitor agent being connectable to the enterprise system over a network, wherein discovering is performed by a software module on the courier device by attempting communication with the monitor agent and by performing a filtering operation to avoid discovery of at least one other device;
    capturing the monitor agent to thereby redirect communications from the monitor agent to the courier device;
    communicating the first information from the courier device to the monitor agent, the monitor agent being disconnected from the enterprise system when the first information is communicated from the courier device, the courier device being separate from the enterprise system; and
    communicating, to the monitor agent, confirmation that the enterprise system received second information previously sent to the courier device by the monitor agent for transmission to the enterprise system, the second information being different from the first information.

2. The method of claim 1, wherein the first information is for performing device management operations when the courier device visits a location of the target device.

3. The method of claim 1, wherein the first information comprises messages and content associated with the target device.

4. The method of claim 1, wherein the first information is compressed.

5. The method of claim 2, further comprising receiving device information from the monitor agent.

6. The method of claim 5, wherein the device information comprises (i) a bundle comprised of pieces of device information or (ii) compressed device information.

7. The method of claim 1, further comprising receiving, from the monitor agent, at least one of device information stored on the monitor agent and responses to messages contained in the first information.

8. The method of claim 1, wherein, during communicating, the courier device is at a site of the target device.

9. The method of claim 1, further comprising receiving the first information from the enterprise system.

10. The method of claim 1, further comprising:
    receiving device information from the monitor agent, the device information relating to the target device; and
    communicating the device information to the enterprise system.

11. A method comprising:
    the method of claim 1 performed by the courier device; and
    a method performed by the enterprise system, the method performed by the enterprise system being performed prior to the method of claim 1 performed by the courier device, the method performed by the enterprise system comprising:
        selecting the target device;
        determining that the monitor agent is disconnected from the enterprise system; and
        sending, to the courier device, the first information and the confirmation that the enterprise system received the second information.

12. A computer-readable storage medium that stores instructions that are executable by a courier device configured to communicate with one or more devices, the courier device storing first information relating to a target device among the one or more devices, the first information being received from an enterprise system, the instructions for performing operations comprising:
    discovering a monitor agent that is associated with the target device and that is disconnected from the enterprise system, the monitor agent being connectable to the enterprise system over a network, wherein discovering is performed by a software module comprising at least some of the instructions (i) by attempting communication with the monitor agent and (ii) by performing a filtering operation to avoid discovery of at least one other device;
    capturing the monitor agent to thereby redirect communications from the monitor agent to the courier device;
    communicating the first information from the courier device to the monitor agent, the monitor agent being disconnected from the enterprise system when the first information is communicated from the courier device, the courier device being separate from the enterprise system; and
    communicating, to the monitor agent, confirmation that the enterprise system received second information previously sent to the courier device by the monitor agent for transmission to the enterprise system, the second information being different from the first information.

13. The computer-readable storage medium of claim 12, wherein the first information is for performing device management operations when the courier device visits a location of the target device.

14. The computer-readable storage medium of claim 12, wherein the first information comprises messages and content associated with the target device.

15. The computer-readable storage medium of claim 12, wherein the first information is compressed.

16. The computer-readable storage medium of claim 13, wherein the operations comprise receiving device information from the monitor agent.

17. The computer-readable storage medium of claim 16, wherein the device information comprises (i) a bundle comprised of pieces of device information or (ii) compressed device information.

18. The computer-readable storage medium of claim 12, wherein the operations comprise receiving, from the monitor agent, at least one of device information stored on the monitor agent and responses to messages contained in the first information.

19. The computer-readable storage medium of claim 12, wherein the operations comprise:
    receiving device information from the monitor agent, the device information relating to the target device; and
    communicating the device information to the enterprise system.

20. A courier device configured to communicate with one or more devices, the courier device comprising:
- memory storing (i) instructions and (ii) first information relating to a target device among the one or more devices, the first information being received from an enterprise system; and
- a processing device to execute the instructions to perform operations comprising:
  - discovering a monitor agent that is associated with the target device and that is disconnected from the enterprise system, the monitor agent being connectable to the enterprise system over a network, wherein discovering is performed by a software module comprising at least some of the instructions (i) by attempting communication with the monitor agent and (ii) by performing a filtering operation to avoid discovery of at least one other device;
  - capturing the monitor agent to thereby redirect communications from the monitor agent to the courier device;
  - communicating the first information from the courier device to the monitor agent, the monitor agent being disconnected from the enterprise system when the first information is communicated from the courier device, the courier device being separate from the enterprise system; and
  - communicating, to the monitor agent, confirmation that the enterprise system received second information previously sent to the courier device by the monitor agent for transmission to the enterprise system, the second information being different from the first information.

21. The courier device of claim 20, wherein the first information is for performing device management operations when the courier device visits a location of the target device.

22. The courier device of claim 20, wherein the first information comprises messages and content associated with the target device.

23. The courier device of claim 20, wherein the first information is compressed.

24. The courier device of claim 21, wherein the operations comprise receiving device information from the monitor agent.

25. The courier device of claim 24, wherein the device information comprises (i) a bundle comprised of pieces of device information or (ii) compressed device information.

26. The courier device of claim 20, wherein the operations comprise receiving, from the monitor agent, at least one of device information stored on the monitor agent and responses to messages contained in the first information.

27. The courier device of claim 20, wherein the courier device is configured for communication at a site of the target device.

28. The courier device of claim 20, wherein the operations comprise receiving the first information from the enterprise system.

29. The courier device of claim 20, wherein the operations comprise:
- receiving device information from the monitor agent, the device information relating to the target device; and
- communicating the device information to the enterprise system.

* * * * *

UNITED STATES PATENT AND TRADEMARK OFFICE
CERTIFICATE OF CORRECTION

PATENT NO.         : 8,478,861 B2                                    Page 1 of 1
APPLICATION NO.    : 11/774474
DATED              : July 2, 2013
INVENTOR(S)        : John Louis Taylor It is certified that error appears in the above-identified patent and that said Letters Patent is hereby corrected as shown below:

Title Page Col. 2 (Abstract), Line 1, After "managing" insert -- distributed --.

Title Page Col. 2 (Abstract), Line 5, Delete "monitored" and insert -- monitor --, therefor.

Title Page 5, Col. 2 (Other Publications), Line 1, Delete "Acces" and insert -- Access --, therefor.

Title Page 6, Col. 1 (Other Publications), Line 9, Delete "Electromedia" and insert -- Electromedical --, therefor.

Title Page 6, Col. 1 (Other Publications), Line 23, Delete "Protessional" and insert -- Professional --, therefor.

Title Page 6, Col. 1 (Other Publications), Line 63, Delete "Expolosive" and insert -- Explosive --, therefor.

Title Page 6, Col. 2 (Other Publications), Line 10, Delete "Intraview" and insert -- Interview --, therefor.

Signed and Sealed this
Third Day of September, 2013

Teresa Stanek Rea
*Acting Director of the United States Patent and Trademark Office*